US011805561B2

(12) United States Patent
Huang et al.

(10) Patent No.: US 11,805,561 B2
(45) Date of Patent: Oct. 31, 2023

(54) MULTI-LINK DEVICE RE-SETUP AND TRANSITION

(71) Applicant: Intel Corporation, Santa Clara, CA (US)

(72) Inventors: Po-Kai Huang, San Jose, CA (US); Ido Ouzieli, Tel Aviv (IL); Robert J. Stacey, Portland, OR (US); Danny Alexander, Neve Efraim Monoson (IL); Daniel F. Bravo, Hillsboro, OR (US); Laurent Cariou, Portland, OR (US); Arik Klein, Givaat Shmuel (IL)

(73) Assignee: Intel Corporation, Santa Clara, CA (US)

( * ) Notice: Subject to any disclaimer, the term of this patent is extended or adjusted under 35 U.S.C. 154(b) by 293 days.

(21) Appl. No.: 17/133,425

(22) Filed: Dec. 23, 2020

(65) Prior Publication Data

US 2021/0120602 A1    Apr. 22, 2021

Related U.S. Application Data

(60) Provisional application No. 63/016,804, filed on Apr. 28, 2020.

(51) Int. Cl.
*H04W 76/14* (2018.01)
*H04W 88/06* (2009.01)
(Continued)

(52) U.S. Cl.
CPC .............. *H04W 76/14* (2018.02); *H04W 8/02* (2013.01); *H04W 76/11* (2018.02); *H04W 76/15* (2018.02); *H04W 88/06* (2013.01)

(58) Field of Classification Search
CPC ..... H04W 76/14; H04W 76/15; H04W 76/11; H04W 8/02; H04W 88/06; H04W 12/04;
(Continued)

(56) References Cited

U.S. PATENT DOCUMENTS

2016/0127903 A1* 5/2016 Lee .................... H04W 36/0038
 713/168
2016/0374118 A1* 12/2016 Mestanov ............... H04W 8/02
(Continued)

*Primary Examiner* — Rushil P. Sampat
(74) *Attorney, Agent, or Firm* — Schwegman Lundberg & Woessner, P.A.

(57) ABSTRACT

Multi-link device (MLD) devices and transitions are described. The MAC addresses of the AP MLD and non-AP MLD are used to generate keys for different fast transitions (FT) between a non-AP MLD and an AP MLD. In an FT initial mobility domain operation, the AP MLD MAC address is used as the R1KH-ID and the non-AP MLD MAC address is used as the S0KH-ID and S1KH-ID. The MAC addresses are exchanged in Authentication Request/Response or Association Request/Response messages and the GTK/IGTK/BIGTK are delivered in a single FT 4-way handshake. In a fast MLD transition to an AP MLD in the same ESS, the other AP MLD MAC address is used as the R1KH-ID and the non-AP MLD MAC address is used as the S1KH-ID. The MAC addresses are exchanged in Authentication Request/Response or Association Request/Response messages and the GTK/IGTK/BIGTK are delivered in an FTE.

15 Claims, 22 Drawing Sheets

(51) Int. Cl.
*H04W 8/02* (2009.01)
*H04W 76/15* (2018.01)
*H04W 76/11* (2018.01)

(58) Field of Classification Search
CPC ........... H04W 12/041; H04W 12/0431; H04W 12/06; H04W 36/0038; H04W 84/005; H04W 84/12; H04L 9/0841; H04L 63/068; H04L 9/0861; H04L 9/0869; H04L 2209/80
See application file for complete search history.

(56) References Cited

U.S. PATENT DOCUMENTS

2017/0353983 A1* 12/2017 Grayson ............... H04W 12/06
2021/0321243 A1* 10/2021 Patil ...................... H04W 76/15

* cited by examiner

| Subelement D | Length | Link ID | Key ID | BIPN | Key Length | Wrapped Key |

FIG. 11A

| Subelement D | Length | Link ID | Key ID | IPN | Key Length | Wrapped Key |

FIG. 11B

| SubelementID | Length | Link ID | Key Info | Key Length | RSC | Wrapped Key |

FIG. 11C

| Element ID | Length | MIC Control | MIC | ANonce | SNonce | Optional Parameter(s) |
|---|---|---|---|---|---|---|
| 1 | 1 | 2 | variable | 32 | 32 | variable |

Octets:

FIG. 12A

| Subelement ID | Length | Data |
|---|---|---|
| 1 | 1 | variable |

Octets:

FIG. 12B

| RESOURCE REQUEST | RESOURCE REQUEST | RESOURCE REQUEST |

FIG. 13A

| RDE | RESOURCE DESCRIPTOR |

FIG. 13B

| RESOURCE REQUEST | RESOURCE REQUEST | RESOURCE REQUEST |

FIG. 13C

| ELEMENT ID | LENGTH | RESOURCE TYPE | VARIABLE PARAMETERS |
|---|---|---|---|
| OCTETS: 1 | 1 | 1 | VARIABLE |

FIG. 13D

| ELEMENT ID | LENGTH | DSE REGISTERED LOCATION INFORMATION |
|---|---|---|
| 1 | 1 | 20 |

OCTETS:

FIG. 13E

| B0 | B1 | B2 | B5 | B6 | B15 |
|---|---|---|---|---|---|
| A-MSDU SUPPORTED | BLOCK ACK POLICY | TID | | BUFFER SIZE | |
| 1 | 1 | 4 | | 10 | |

BITS:

FIG. 13F

| BLOCK ACK TIMEOUT VALUE |
|---|
| 2 |

OCTETS:

FIG. 13G

| FRAGMENT NUMBER (0) | STARTING SEQUENCE NUMBER |
|---|---|
| 4 | 12 |

BITS:

FIG. 13H ns as evolved
MULTI-LINK DEVICE RE-SETUP AND TRANSITION

PRIORITY

This application claims the benefit of priority under 35 USC 119(e) to U.S. Provisional Patent Application Ser. No. 63/016,804, filed Apr. 28, 2020, which is incorporated herein by reference in its entirety.

TECHNICAL FIELD

Aspects pertain to systems and methods for wireless communications. Some aspects relate to communication establishment and, more particularly, to a multi-link device (MLD) re-setup and transition.

BACKGROUND

Efficient wireless local-area network (WLAN) resource use continues to increase in importance as the number and types of wireless communication devices as well as the amount of data and bandwidth being used by various applications, such as video streaming, operating on these devices continues to increase. In many instances, providing sufficient bandwidth and acceptable response times to the users of the WLAN may be challenging, especially when a large number of devices try to share the same resources. It may moreover be desirable for wireless communication devices to extend association procedures to MLDs.

BRIEF DESCRIPTION OF THE DRAWINGS

FIG. 11A illustrates a multi-link beacon integrity group temporal key (BIGTK) sub-element in accordance with some aspects.

FIG. 11B illustrates a multi-link Integrity Group Temporal Key (IGTK) sub-element in accordance with some aspects.

FIG. 11C illustrates a multi-link Group Temporal Key (GTK) sub-element in accordance with some aspects.

FIG. 12A illustrates an FT element (FTE) format in accordance with some aspects.

FIG. 12B illustrates an optional parameters field format in accordance with some aspects.

FIG. 13A illustrates a Resource Information Container (RIC)-request format in accordance with some aspects.

FIG. 13B illustrates a Resource Request format in accordance with some aspects.

FIG. 13C illustrates a RIC-response format in accordance with some aspects.

FIG. 13D illustrates a RIC Descriptor element in accordance with some aspects.

FIG. 13E illustrates a Dependent Station Enablement (DSE) Registered Location element format in accordance with some aspects.

FIG. 13F illustrates a Block Ack Parameter Set field format in accordance with some aspects.

FIG. 13G illustrates a Block Ack Timeout Value field format in accordance with some aspects.

FIG. 13H illustrates a Starting Sequence Control subfield format in accordance with some aspects.

DETAILED DESCRIPTION

The following description and the drawings sufficiently illustrate specific embodiments to enable those skilled in the art to practice them. Other embodiments may incorporate structural, logical, electrical, process, algorithm, and other changes. Portions and features of some embodiments may be included in, or substituted for, those of other embodiments. Embodiments set forth in the claims encompass all available equivalents of those claims.

Figure 1:
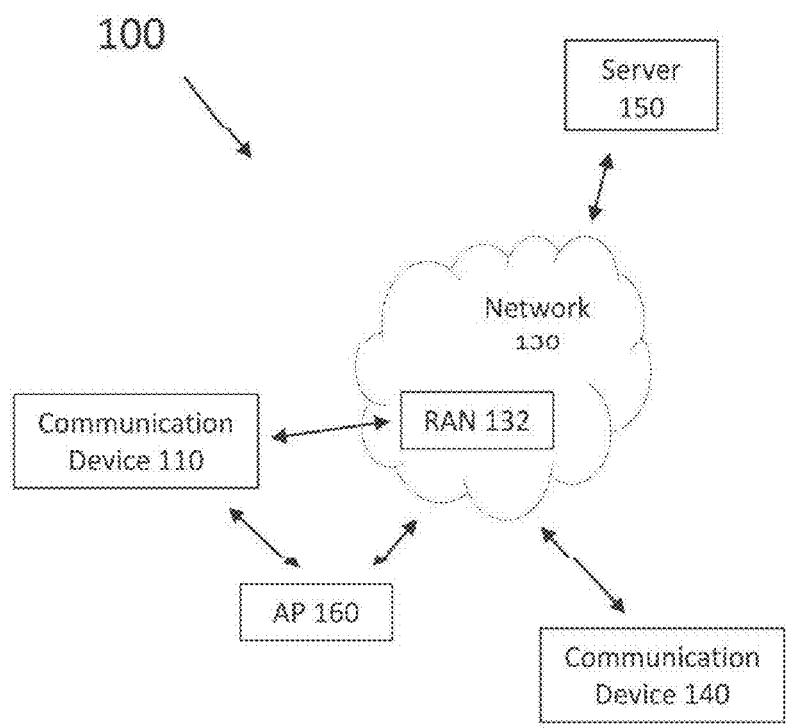
FIG. 1 is a functional block diagram illustrating a system in accordance with some aspects.

FIG. 1 is a functional block diagram illustrating a system according to some aspects. The system 100 may include multiple communication devices (STAs) 110, 140. In some aspects, one or both the communication devices 110, 140 may be communication devices that communicate with each other directly (e.g., via P2P or other short range communication protocol) or via one or more short range or long range wireless networks 130. The communication devices 110, 140 may, for example, communicate wirelessly locally, for example, via one or more random access networks (RANs) 132, WiFi access points (APs) 160 or directly using any of a number of different techniques and protocols, such as WiFi, Bluetooth, or Zigbee, among others. The RANs 132 may contain one or more base stations such as evolved NodeBs (eNBs) and $5^{th}$ generation NodeBs (gNBs) and/or micro, pico and/or nano base stations.

The communication devices 110, 140 may communicate through the network 130 via Third Generation Partnership Project Long Term Evolution (3GPP LTE) protocols and LTE advanced (LTE-A) protocols, 4G protocols or 5G protocols. Examples of communication devices 110, 140 include, but are not limited to, mobile devices such as portable handsets, smartphones, tablet computers, laptop computers, wearable devices, sensors and devices in vehicles, such as cars, trucks or aerial devices (drones). In some cases, the communication devices 110, 140 may communicate with each other and/or with one or more servers 150. The particular server(s) 150 may depend on the application used by the communication devices 110, 140.

The network 130 may contain network devices such as a gateway (e.g., a serving gateway and/or packet data network gateway), a Home Subscriber Server (HSS), a Mobility Management Entity (MME) for LTE networks or an Access and Mobility Function (AMF), User Plane Function (UPF), Session Management Function (SMF) etc., for 5G networks. The network 130 may also contain various servers that provide content or other information related to user accounts.

Figure 2:
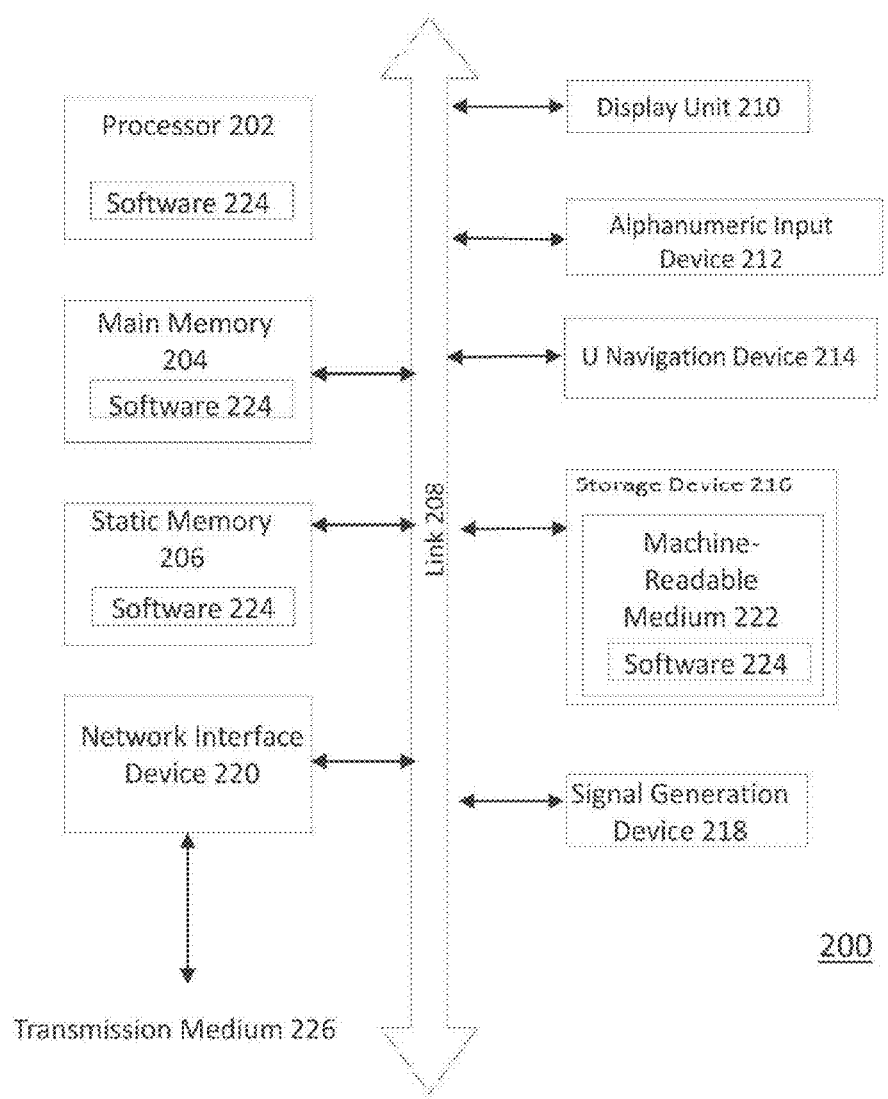
FIG. 2 illustrates a block diagram of a communication device in accordance with some aspects.

FIG. 2 illustrates a block diagram of a communication device in accordance with some embodiments. The communication device 200 may be a communication device such as a specialized computer, a personal or laptop computer (PC), a tablet PC, or a smart phone, dedicated network equipment, a server running software to configure the server to operate as a network device, a virtual device, or any machine capable of executing instructions (sequential or otherwise) that specify actions to be taken by that machine. For example, the communication device 200 may be implemented as one or more of the devices shown in FIG. 1. Note that communications described herein may be encoded before transmission by the transmitting entity (e.g., communication device, AP) for reception by the receiving entity (e.g., AP, communication device) and decoded after reception by the receiving entity.

Examples, as described herein, may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The communication device 200 may include a hardware processor (or equivalently processing circuitry) 202 (e.g., a central processing unit (CPU), a GPU, a hardware processor core, or any combination thereof), a main memory 204 and a static memory 206, some or all of which may communicate with each other via an interlink (e.g., bus) 208. The main memory 204 may contain any or all of removable storage and non-removable storage, volatile memory or non-volatile memory. The communication device 200 may further include a display unit 210 such as a video display, an alphanumeric input device 212 (e.g., a keyboard), and a user interface (UI) navigation device 214 (e.g., a mouse). In an example, the display unit 210, input device 212 and UI navigation device 214 may be a touch screen display. The communication device 200 may additionally include a storage device (e.g., drive unit) 216, a signal generation device 218 (e.g., a speaker), a network interface device 220, and one or more sensors, such as a global positioning system (GPS) sensor, compass, accelerometer, or other sensor. The communication device 200 may further include an output controller, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a non-transitory machine readable medium 222 (hereinafter simply referred to as machine readable medium) on which is stored one or more sets of data structures or instructions 224 (e.g., software) embodying or utilized by any one or more of the techniques or functions described herein. The instructions 224 may also reside, completely or at least partially, within the main memory 204, within static memory 206, and/or within the hardware processor 202 during execution thereof by the communication device 200. While the machine readable medium 222 is illustrated as a single medium, the term "machine readable medium" may include a single medium or multiple media (e.g., a centralized or distributed database, and/or associated caches and servers) configured to store the one or more instructions 224.

The term "machine readable medium" may include any medium that is capable of storing, encoding, or carrying instructions for execution by the communication device 200 and that cause the communication device 200 to perform any one or more of the techniques of the present disclosure, or that is capable of storing, encoding or carrying data structures used by or associated with such instructions. Non-limiting machine-readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Radio access Memory (RAM); and CD-ROM and DVD-ROM disks.

The instructions 224 may further be transmitted or received over a communications network using a transmission medium 226 via the network interface device 220 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks. Communications over the networks may include one or more different protocols, such as Institute of Electrical and Electronics Engineers (IEEE) 802.11 family of standards known as Wi-Fi, IEEE 802.16 family of standards known as WiMax, IEEE 802.15.4 family of standards, a Long Term Evolution (LTE) family of standards, a Universal Mobile Telecommunications System (UMTS) family of standards, peer-to-peer (P2P) networks, a next generation (NG)/5$^{th}$ generation (5G) standards among others. In an example, the network interface device 220 may include one or more physical jacks (e.g., Ethernet, coaxial, or phone jacks) or one or more antennas to connect to the transmission medium 226.

Note that the term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" or "processor" as used herein thus refers to, is part of, or includes circuitry capable of sequentially and automatically carrying out a sequence of arithmetic or logical operations, or recording, storing, and/or transferring digital data. The term "processor circuitry" or "processor" may refer to one or more application processors, one or more baseband processors, a physical central processing unit (CPU), a single- or multi-core processor, and/or any other device capable of executing or otherwise operating computer-executable instructions, such as program code, software modules, and/or functional processes.

Devices may operate in accordance with existing IEEE 802.11, 802.11a, 802.11b, 802.11e, 802.11g, 802.11h, 802.11i, 802.11n, 802.11ac, 802.11an, 802.11ax, 802.16, 802.16d, 802.16e standards and/or future versions and/or derivatives and/or Long Term Evolution (LTE) of the above standards. Some embodiments may be used in conjunction with one or more types of wireless communication signals and/or systems, for example, Radio Frequency (RF), Infra-Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), Extended GPRS, Code-Division Multiple Access (CDMA), Wideband CDMA (WCDMA), CDMA 2000, Multi-Carrier Modulation (MDM), Discrete Multi-Tone (DMT), Bluetooth, ZigBee, or the like.

Existing association and reassociation permits moving of an STA among APs. Currently, when a STA associates with an AP, the STA can associate with another AP by sending another reassociation frame. It is desirable to extend re-setup and transition operations to moving from association with an AP to having a multi-link setup with another AP MLD or vice versa (MLD re-setup and transition operations).

In general, fast Basic Service Set (BSS) transition (FT) is used to simplify the roaming procedure from one AP to another AP in the same mobility domain. The FT is designed for roaming among APs. As used herein, a BSS is a set of STAs that have successfully synchronized using the JOIN service primitives and one STA that has used the START primitive. Alternatively, a set of STAs that have used the START primitive specifying matching mesh profiles where the matching of the mesh profiles has been verified via the scanning procedure. Membership in a BSS does not imply that wireless communication with all other members of the BSS is possible. As used previously, a mobility domain is a set of BSSs, within the same extended service set (ESS), that support fast BSS transitions between themselves and that are identified by the set's mobility domain identifier (MDID). An ESS is the union of the infrastructure BSSs with the same SSID connected by a Distribution System (DS). The ESS does not include the DS.

There are two parts of FT: 1) FT initial mobility domain association as described in 13.4 FT initial mobility domain association. This procedure describes the first step to associate with an AP in a mobility domain. The common procedure is FT initial mobility domain association in an RSN as described in 13.4.2 FT initial mobility domain association in an RSN. 2) FT protocol as described in 13.5 FT protocol. This procedure describes how a STA moves from one AP to another AP in a mobility domain. One procedure is Over-the-air FT protocol authentication in an RSN as described in Over-the-air FT protocol authentication in an RSN.

Figure 3:
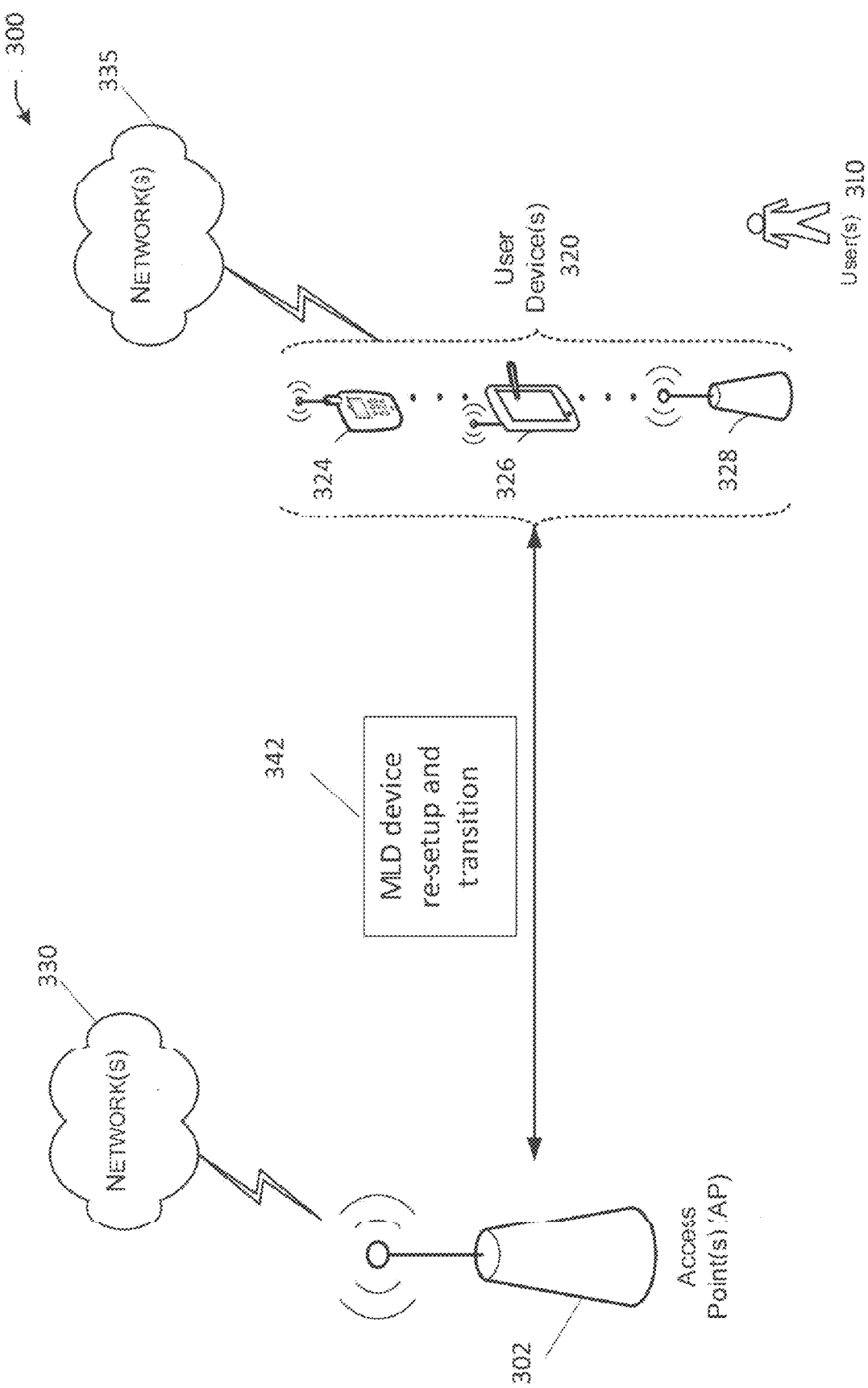
FIG. 3 is a network diagram illustrating a network environment for MLD re-setup and transition in accordance with some aspects.

FIG. 3 is a network diagram illustrating a network environment for MLD re-setup and transition in accordance with some aspects. Wireless network 300 may include one or more user devices 320 and one or more access points(s) (AP) 302, which may communicate in accordance with IEEE 802.11 communication standards. The user device(s) 320 may be mobile devices that are non-stationary (e.g., not having fixed locations) or may be stationary devices. In some embodiments, the user devices 320 and the AP 302 may include one or more computer systems and/or the example machine/system of FIG. 2.

One or more illustrative user device(s) 320 and/or AP(s) 302 may be operable by one or more user(s) 310. It should be noted that any addressable unit may be a station (STA). An STA may take on multiple distinct characteristics, each of which shape its function. For example, a single addressable unit might simultaneously be a portable STA, a quality-of-service (QoS) STA, a dependent STA, and a hidden STA. The one or more illustrative user device(s) 320 and the AP(s) 302 may be STAs. The one or more illustrative user device(s) 320 and/or AP(s) 302 may operate as a personal basic service set (PBSS) control point/access point (PCP/AP). The user device(s) 320 (e.g., 324, 326, or 328) and/or AP(s) 302 may include any suitable processor-driven device including, but not limited to, a mobile device or a non-mobile, e.g., a static device. For example, user device(s) 320 and/or AP(s) 302 may include, a UE or STA, an AP, a software enabled AP (SoftAP), a PC, a wearable wireless device (e.g., bracelet, watch, glasses, ring, etc.), a desktop computer, a mobile computer, a laptop computer, an ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. Other devices, including smart devices such as lamps, climate control, car components, household components, appliances, etc. may also be included in this list.

As used herein, the term "Internet of Things (IoT) device" is used to refer to any object (e.g., an appliance, a sensor, etc.) that has an addressable interface (e.g., an Internet protocol (IP) address, a Bluetooth identifier (ID), a near-field communication (NFC) ID, etc.) and can transmit information to one or more other devices over a wired or wireless connection. An IoT device may have a passive communication interface, such as a quick response (QR) code, a radio-frequency identification (RFID) tag, an NFC tag, or the like, or an active communication interface, such as a modem, a transceiver, a transmitter-receiver, or the like. An IoT device can have a particular set of attributes (e.g., a device state or status, such as whether the IoT device is on or off, open or closed, idle or active, available for task execution or busy, and so on, a cooling or heating function, an environmental monitoring or recording function, a light-emitting function, a sound-emitting function, etc.) that can be embedded in and/or controlled/monitored by a CPU, microprocessor, ASIC, or the like, and configured for connection to an IoT network such as a local ad-hoc network or the Internet. For example, IoT devices may include, but are not limited to, refrigerators, toasters, ovens, microwaves, freezers, dishwashers, dishes, hand tools, clothes washers, clothes dryers, furnaces, air conditioners, thermostats, televisions, light fixtures, vacuum cleaners, sprinklers, electricity meters, gas meters, etc., so long as the devices are equipped with an addressable communications interface for communicating with the IoT network. IoT devices may also include cell phones, desktop computers, laptop computers, tablet computers, personal digital assistants (PDAs), etc. Accordingly, the IoT network may be comprised of a combination of "legacy" Internet-accessible devices (e.g., laptop or desktop computers, cell phones, etc.) in addition to devices that do not typically have Internet-connectivity (e.g., dishwashers, etc.).

The user device(s) 320 and/or AP(s) 302 may also include mesh stations in, for example, a mesh network, in accordance with one or more IEEE 802.11 standards and/or 3GPP standards.

Any of the user device(s) 320 (e.g., user devices 324, 326, 328), and AP(s) 302 may be configured to communicate with each other via one or more communications networks 330 and/or 335 wirelessly or wired. The user device(s) 320 may also communicate peer-to-peer or directly with each other with or without the AP(s) 302. Any of the communications networks 330 and/or 335 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 330 and/or 335 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 330 and/or 335 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the user device(s) 320 (e.g., user devices 324, 326, 328) and AP(s) 302 may include one or more communications antennas. The one or more communications antennas may be any suitable type of antennas corresponding to the communications protocols used by the user device(s) 320 (e.g., user devices 324, 326 and 328), and AP(s) 302. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, omnidirectional antennas, quasi-omnidirectional antennas, or the like. The one or more communications antennas may be communicatively coupled to a radio component to transmit and/or receive signals, such as communications signals to and/or from the user devices 320 and/or AP(s) 302.

Any of the user device(s) 320 (e.g., user devices 324, 326, 328), and AP(s) 302 may be configured to perform directional transmission and/or directional reception in conjunction with wirelessly communicating in a wireless network. Any of the user device(s) 320 (e.g., user devices 324, 326, 328), and AP(s) 302 may be configured to perform such directional transmission and/or reception using a set of multiple antenna arrays (e.g., DMG antenna arrays or the like). Each of the multiple antenna arrays may be used for transmission and/or reception in a particular respective direction or range of directions. Any of the user device(s) 320 (e.g., user devices 324, 326, 328), and AP(s) 302 may be configured to perform any given directional transmission towards one or more defined transmit sectors. Any of the user device(s) 320 (e.g., user devices 324, 326, 328), and AP(s) 302 may be configured to perform any given directional reception from one or more defined receive sectors.

MIMO beamforming in a wireless network may be accomplished using RF beamforming and/or digital beamforming. In some embodiments, in performing a given MIMO transmission, user devices 320 and/or AP(s) 302 may be configured to use all or a subset of its one or more communications antennas to perform MIMO beamforming.

Any of the user devices 320 (e.g., user devices 324, 326, 328), and AP(s) 302 may include any suitable radio and/or transceiver for transmitting and/or receiving radio frequency (RF) signals in the bandwidth and/or channels corresponding to the communications protocols utilized by any of the user device(s) 320 and AP(s) 302 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In certain example embodiments, the radio component, in cooperation with the communications antennas, may be configured to communicate via 2.4 GHz channels (e.g. 802.11b, 802.11g, 802.11n, 802.11ax), 5 GHz channels (e.g. 802.11n, 802.11ac, 802.11ax), or 60 GHZ channels (e.g. 802.11ad, 802.11ay), 800 MHz channels (e.g. 802.11ah). The communications antennas may operate at 28 GHz and 40 GHz. It should be understood that this list of communication channels in accordance with certain 802.11 standards is only a partial list and that other 802.11 standards may be used (e.g., Next Generation Wi-Fi, or other standards). In some embodiments, non-Wi-Fi protocols may be used for communications between devices, such as Bluetooth, dedicated short-range communication (DSRC), Ultra-High Frequency (UHF) (e.g. IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

In one embodiment, and with reference to FIG. 3, AP 302 may perform MLD device re-setup and transition 342 with one or more user devices 320. It is understood that the above descriptions are for purposes of illustration and are not meant to be limiting.

Figure 4:
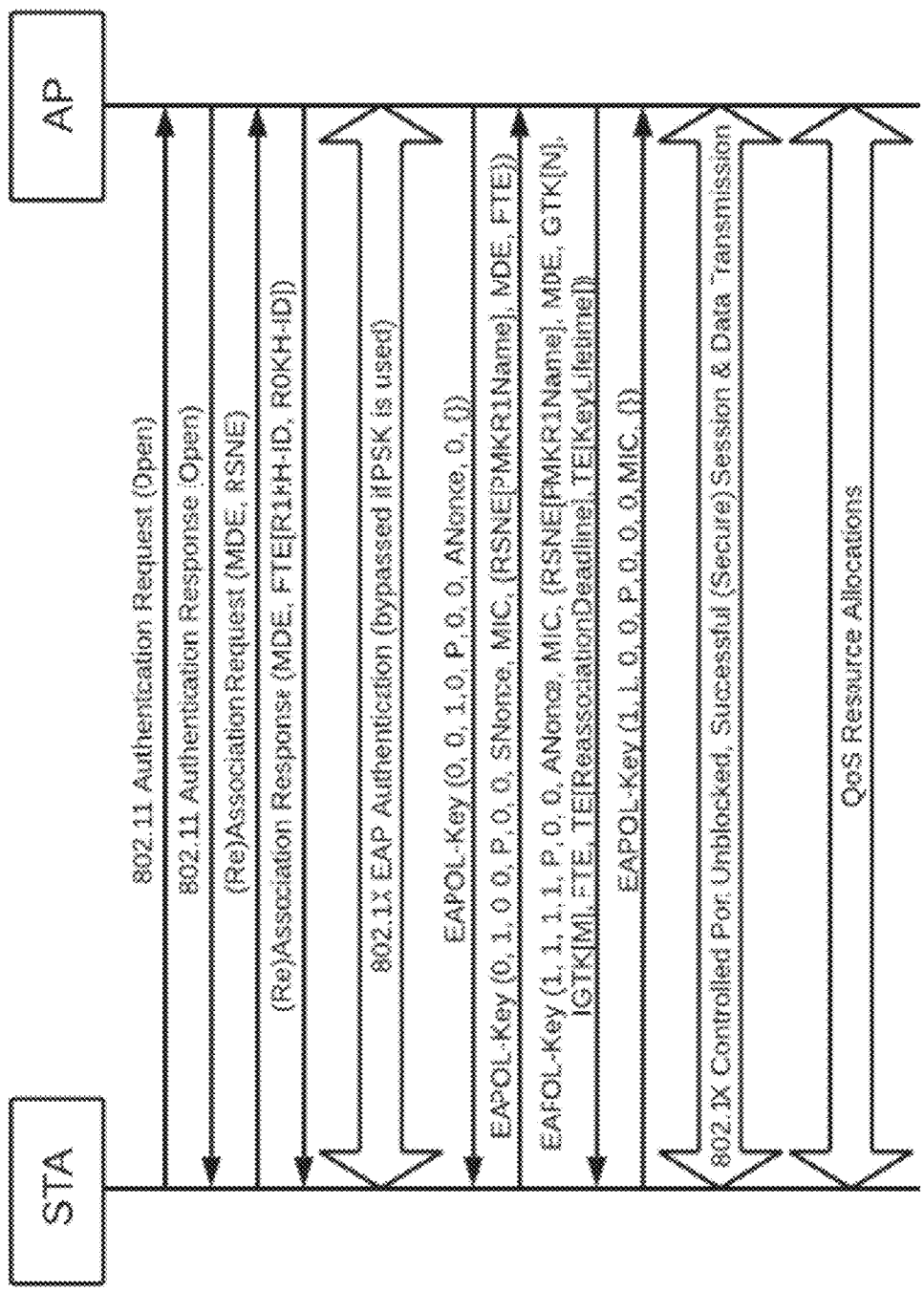
FIG. 4 illustrates a fast Basic Service Set (BSS) transition (FT) initial mobility domain setup in accordance with some aspects.

FIG. 4 illustrates an FT initial mobility domain setup in accordance with some aspects. In particular, FIG. 4 illustrates a flow for the initial association in an RSN between a STA and an AP, including an authentication request/response exchange to achieve open system authentication, which admits any STA to the DS. After the authentication request/response exchange, an association request/response is used to exchange mobility domain information in mobility domain element (MDE) and FT information in a Fast BSS Transition element (FTE). Then 802.1X EAP authentication is used to generate Pairwise Master Key (PMK)-R0, to be used to generate any PMK-R1, and PMK-R1 between the pair of AP and STA. A FT 4-way handshake is used to generate the Pairwise Transit Key (PTK) and deliver GTK, IGTK, BIGTK.

Figure 5:
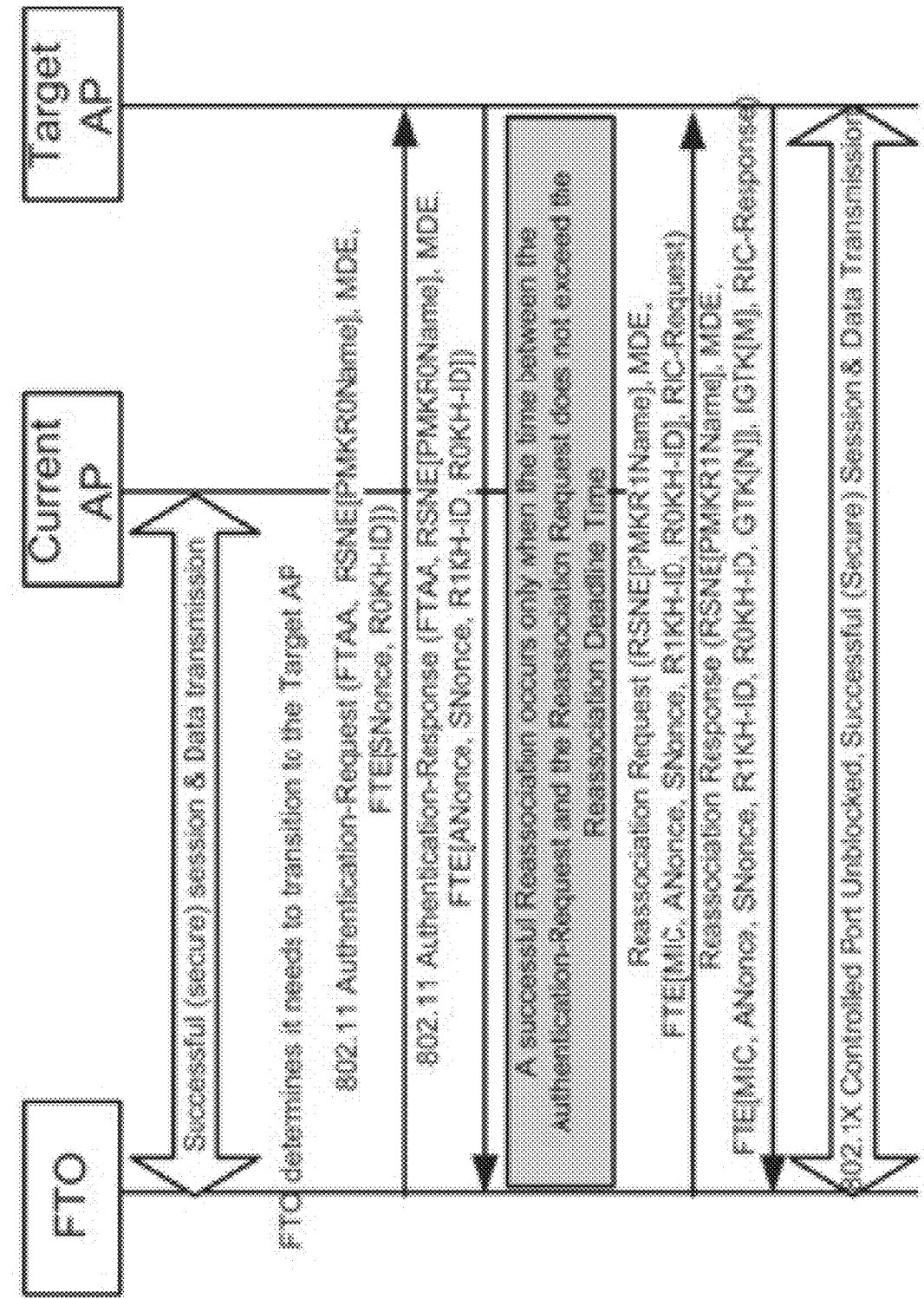
FIG. 5 illustrates over-the-air FT protocol in accordance with some aspects.

FIG. 5 illustrates over-the-air FT protocol in accordance with some aspects. In particular, FIG. 5 illustrates transition between a current AP and a Target AP. As shown, the flow for the roaming in an RSN includes the STA or FTO performing FT authentication to generate a PTK based on the PMK-R1 between the STA and the target AP. PMK-R1 is generated based on PMK-R0. The STA or FTO performs a reassociation request/response exchange with the target AP. GTK, IGTK, BIGTK are delivered by the target AP in the FTE carried in the reassociation response.

In the Authentication-Request frame of FIG. 5, the SA field of the message header is set to the MAC address of the FTO, and the DA field of the message header is set to the BSSID of the target AP. In the Authentication-Response frame, the SA field of the message header is set to the BSSID of the target AP, and the DA field of the message header is set to the MAC address of the FTO.

Figure 6:
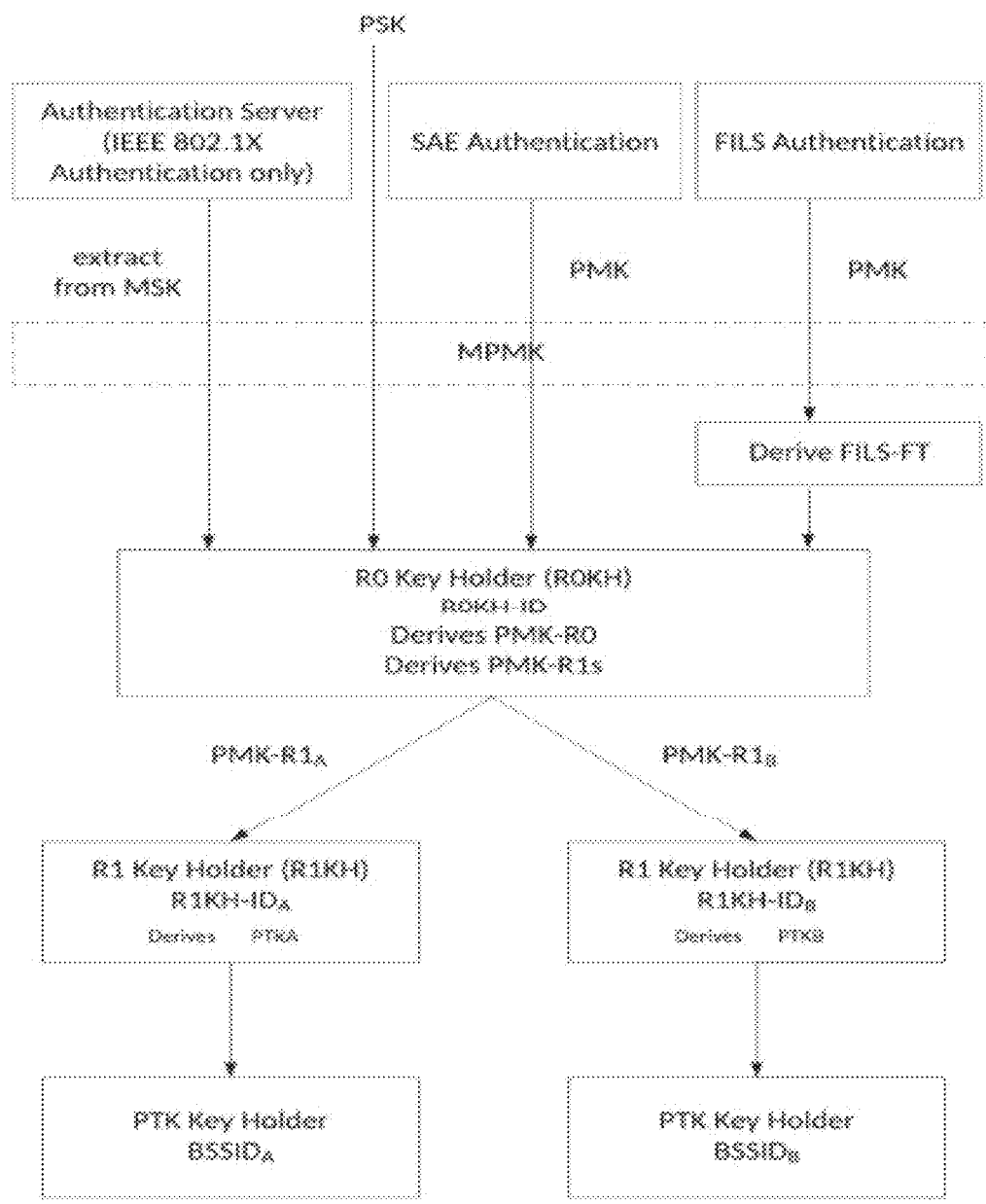
FIG. 6 illustrates FT key hierarchy at authentication in accordance with some aspects.
Figure 7:
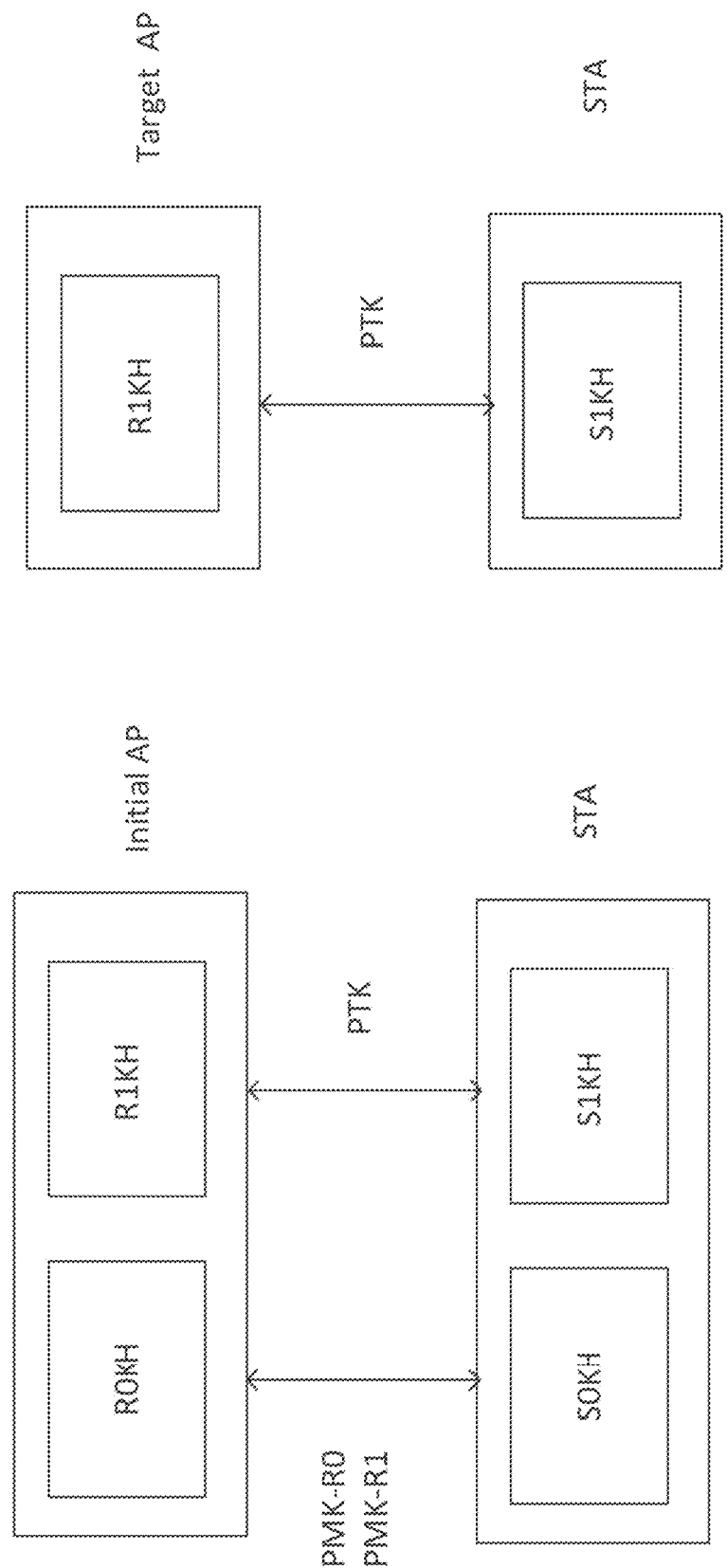
FIG. 7 illustrates a key exchange in accordance with some aspects.

FIG. 6 illustrates FT key hierarchy at authentication in accordance with some aspects. FIG. 7 illustrates a key exchange in accordance with some aspects. On the AP side, the R0 key holder (R0KH) interacts with the IEEE 802.1X Authenticator to receive the MSK resulting from an EAP authentication. The R0KH generates PMK-R0 and PMK-R1. Each PMK-R1 is for an AP and STA pair. The R1 key holder (R1KH) interacts with the IEEE 802.1X Authenticator to open the Controlled Port.

On the STA side, the S0 key holder (S0KH) interacts with the IEEE 802.1X functional block. This is shown in FIG. 4-24 (Portion of the ISO/IEC basic reference model covered in the IEEE 802.11 be standard) in 4.9 (Reference model)) to receive the MSK resulting from an EAP authentication or the (#114) FILS-FT resulting from a FILS authentication (11ai). The S1 Key holder (S1KH) interacts with the IEEE 802.1X entity to open the Controlled Port (FT 4 way handshake).

Figure 8A:
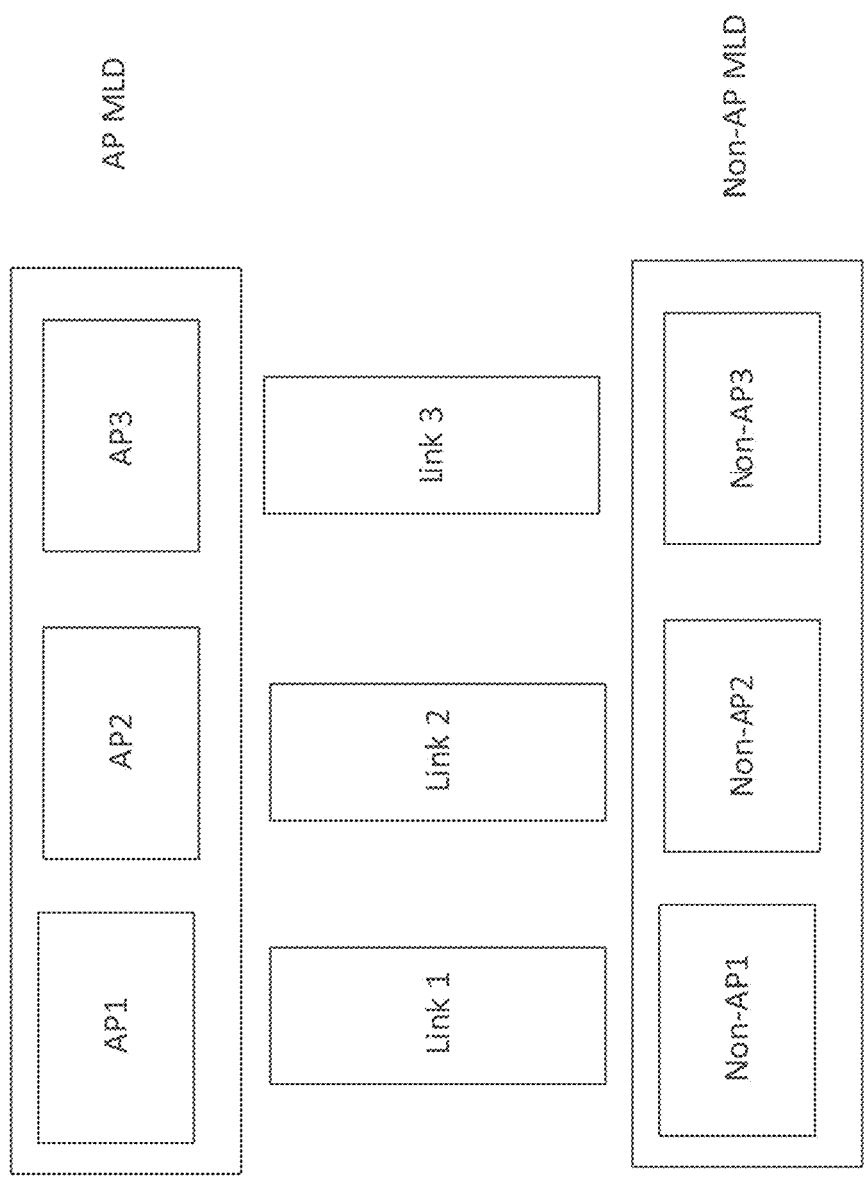
FIG. 8A illustrates MLD connections in accordance with some aspects.

FIG. 8A illustrates MLD connections in accordance with some aspects. MLD is a logical entity that contains one or more STAs. The logical entity has one medium access control layer (MAC) data service interface and primitives to the logical link control (LLC) and a single address associated with the interface, which can be used to communicate on the distribution system medium (DSM). An MLD is a device that has more than one affiliated STA and has one MAC SAP to LLC, which includes one MAC data service. An AP MLD is an MLD in which each STA affiliated with the MLD is an AP. A non-AP MLD is an MLD in which each STA affiliated with the MLD is a non-AP STA.

An MLD has a MAC address that identifies the MLD management entity. An MLD allows STAs within the multi-link logical entity to have the same MAC address. An MLD allows multiple links to be established between an AP MLD and a non-AP MLD. The MAC address can be used in multi-link setup between a non-AP MLD and an AP MLD. As shown in FIG. 8, the AP MLD has affiliated APs and the non-AP MLD has affiliated non-AP STAs. Thus, multiple links can be set up so that the non-AP MLD can use any links afterwards. Note that compared with FT, when the non-AP MLD uses different links, FT sequence exchange can be avoided. As a result, MLD functionality simplifies the FT procedure.

Figure 8B:
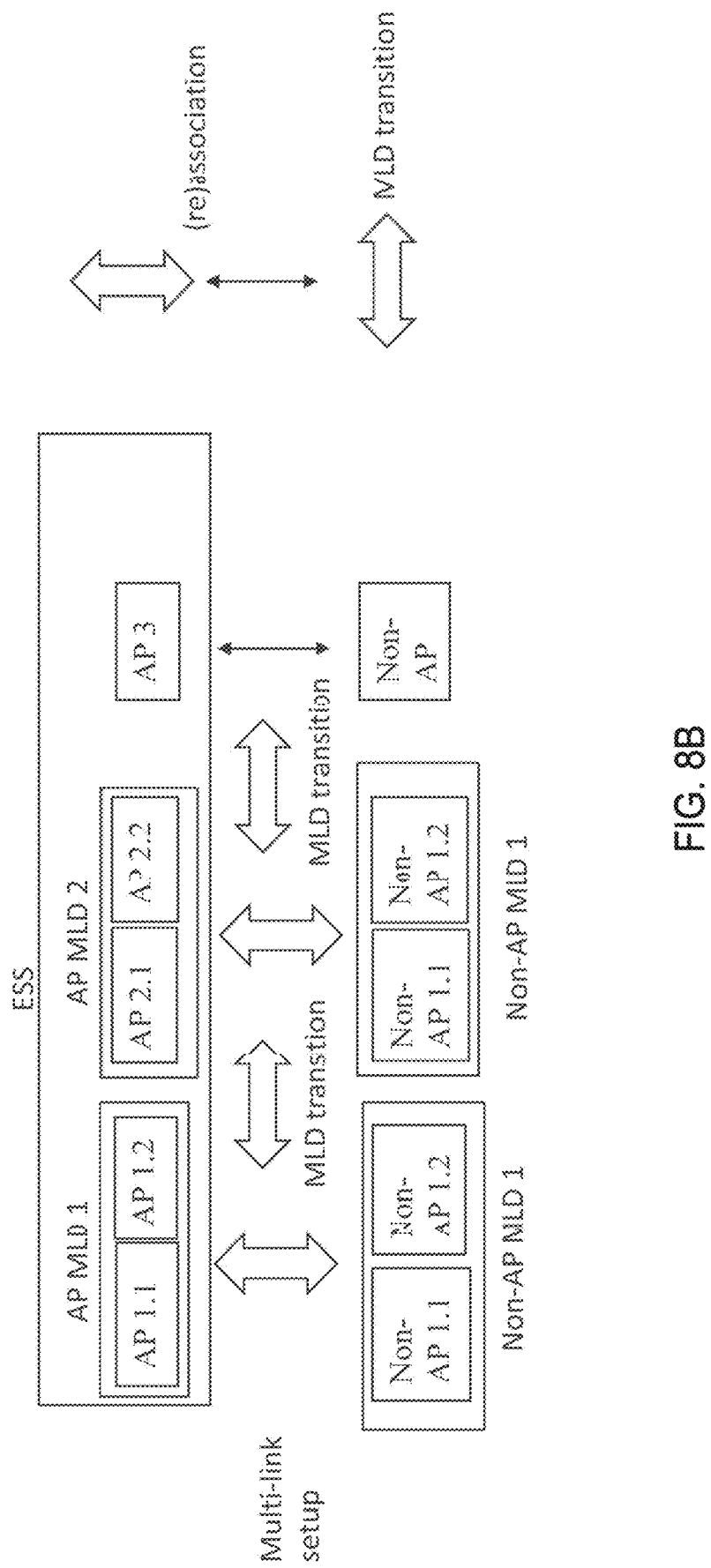
FIG. 8B illustrates MLD transmission in an extended service set (ESS) in accordance with some aspects.

FIG. 8B illustrates MLD transmission in an extended service set (ESS) in accordance with some aspects. As shown, the ESS may contain a mix of AP MLDs and APs that are not part of an MLD, or may contain only AP MLDs. MLD transitions may be between AP MLDs rather than between individual APs within the AP MLDs.

When there is an MLD, there different FT and roaming scenarios exist, which include: from an AP MLD to another AP MLD, from a legacy AP to another AP MLD, and from an AP MLD to another legacy AP. However, at present FT has not yet been extended to enable all 3 operations above. Accordingly, various embodiments herein relate to systems, methods, and devices for MLD re-setup and transition.

Some embodiments expand reassociation for at least the use cases from a legacy AP to another AP MLD and from an AP MLD to another legacy AP in an MLD device re-setup and transition system. In addition, various embodiments allow FT for the use cases of from an AP MLD to another AP MLD, from a legacy AP to another AP MLD, and from an AP MLD to another legacy AP. Specifically, a FT originator (FTO) can be a non-AP MLD, a "Current AP" can be a "Current AP MLD, a "Target AP" can be a "Target AP MLD", and the BSSs created by the APs in a MLD are in the same mobility domain, i.e., those APs have the same SSID.

In addition, various embodiments allow a R0KH/R1KH/S0KH/S1KH key holder to be within an MLD. Specifically, R0KH and R1KH may be in an AP MLD while S0KH and S1KH may be in a non-AP MLD.

Moreover, during the computation of a key and ID, such as PMK-R0, PMK-R1, PMKR1Name, PMKID, PTK, PTK-Name, the S0KH-ID and S1KH-ID uses a non-AP MLD MAC address while R1KH-ID uses the AP MLD MAC address. Also, the Authenticator Address (AA) may be adjusted to the AP MLD MAC address and single packet authentication (SPA) may be adjusted to the non-AP MLD MAC address when computing the PMKID for PMK-R1 between the AP MLD and non-AP MLD. Similarly, the BSSID may be changed to the AP MLD MAC address and the STA-ADDR may be changed to the non-AP MLD address when computing the PTK and PTKName between the AP MLD and non-AP MLD.

Also, delivery of a group temporal key (GTK)/integrity group temporal key (IGTK)/beacon integrity group transient key (BIGTK) of different links may be allowed in one FT 4-way handshake and FTE during a reassociation response from a Target MLD. In addition, when a non-AP MLD performs FT from a legacy AP to an AP MLD or from an AP MLD to a legacy AP, S1KH-ID is the same, i.e., the non-AP MLD MAC address. Moreover, for the authentication request/response frame exchange between FTOs, i.e., a non-AP MLD and a Target AP MLD, then the RA/TA is the address of the STA of the non-AP MLD or AP MLD that sends or receives the authentication request/response frame. The MLD address is included in the authentication request/response frame to identify the MLD.

The above permits the FT protocol to be used when roaming from one AP MLD to another AP MLD, which saves the timing of roaming between MLDs. In addition, the above also allows the FT protocol to be used when roaming from a legacy AP to another AP MLD, which saves roaming time between an MLD and a legacy AP.

A multi-link re-setup can be defined as: 1) a non-AP MLD moving from having multi-link setup with one AP MLD to having multi-link setup with another AP MLD, 2) a non-AP MLD moving from having multi-link setup with one AP MLD to become a non-AP STA having association with another AP, and 3) a non-AP STA moving from a non-AP STA having association with one AP to become a non-AP MLD having multi-link setup with another AP MLD. For 2 and 3, the MAC address of the non-AP STA is the same as the non-AP MLD MAC address.

To expand the fast BSS transition to a fast MLD transition, further definitions are provided as follows. An MLD transition is: 1) a non-AP MLD moving from having a multi-link setup with one AP MLD in one ESS to having a multi-link setup with another AP MLD within the same ESS, 2) a non-AP MLD moving from having a multi-link setup with one AP MLD in one ESS to become a non-AP STA having association with another AP within the same ESS, and 3) a non-AP STA moving from a non-AP STA having association with one AP in one ESS to become a non-AP MLD having a multi-link setup with another AP MLD with the same ESS.

The fast MLD transition is an MLD transition that establishes the state used for data connectivity before the multi-link re-setup or reassociation rather than after the multi-link re-setup or reassociation. The AP MLD is in one ESS if all the APs affiliated with the AP MLD have BSSs in the same ESS.

It is desirable to expand FT for the use cases: from an AP MLD to another AP MLD, from a legacy AP to another AP MLD, and from an AP MLD to another legacy AP. The FTO can be a non-AP MLD. The "Current AP" can be "Current AP MLD", and the "Target AP" can be "Target AP MLD". The BSSs created by the APs in an AP MLD will be in the same mobility domain, i.e., those APs have the same SSID. As used herein, the mobility domain is a set of BSSs, within the same ESS, that support fast BSS transitions and fast MLD transitions between themselves and that are identified by the set's mobility domain identifier (MDID).

Figure 9:
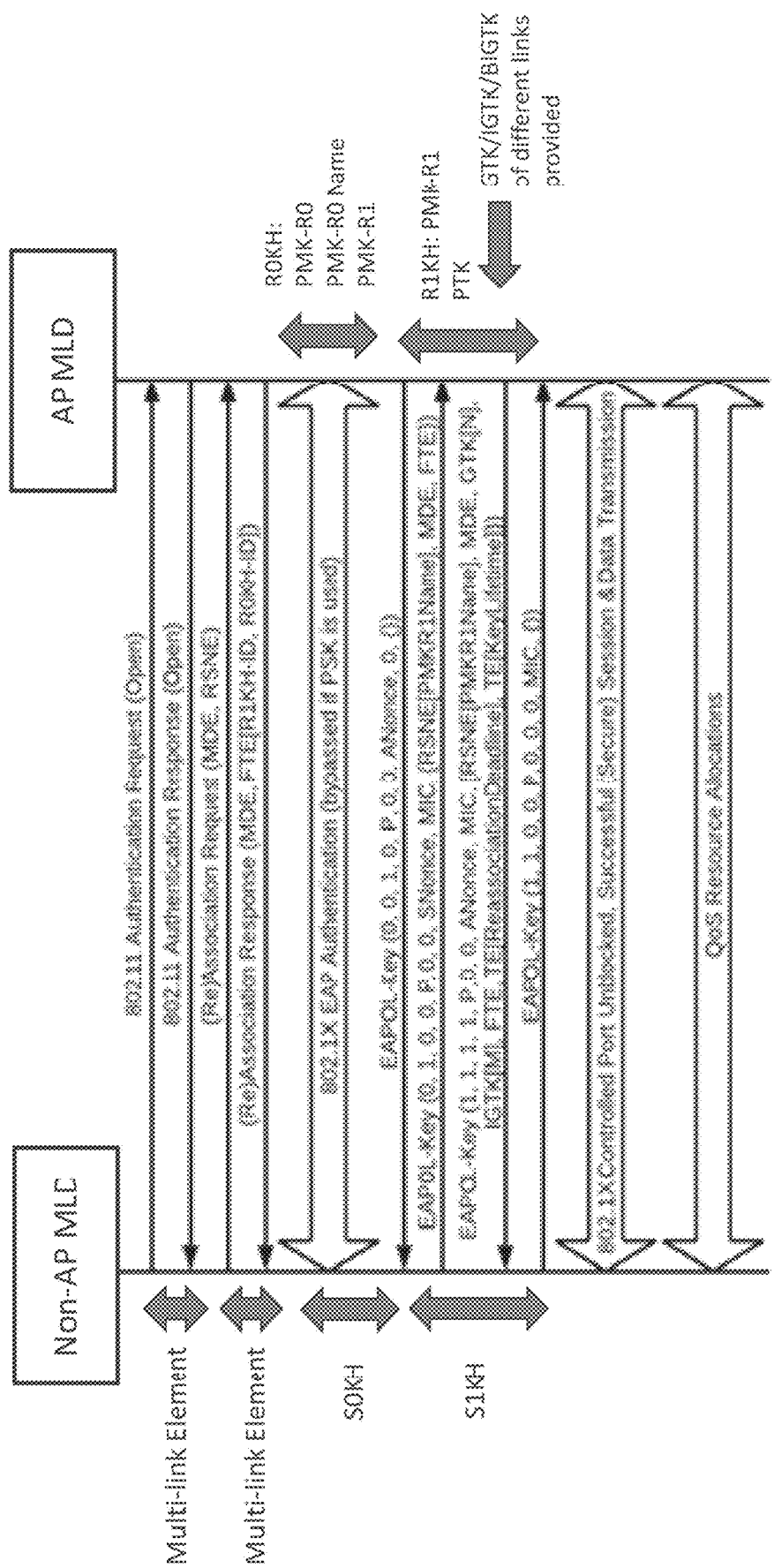
FIG. 9 illustrates an FT initial mobility domain MLD setup in accordance with some aspects.

As a result, the initial domain operations are changed. FIG. 9 illustrates an FT initial mobility domain MLD setup in accordance with some aspects. As illustrated in FIG. 9, the operations occur between a non-AP MLD and an AP MLD instead of between a STA and an AP, as shown in FIG. 4.

Figure 10A:
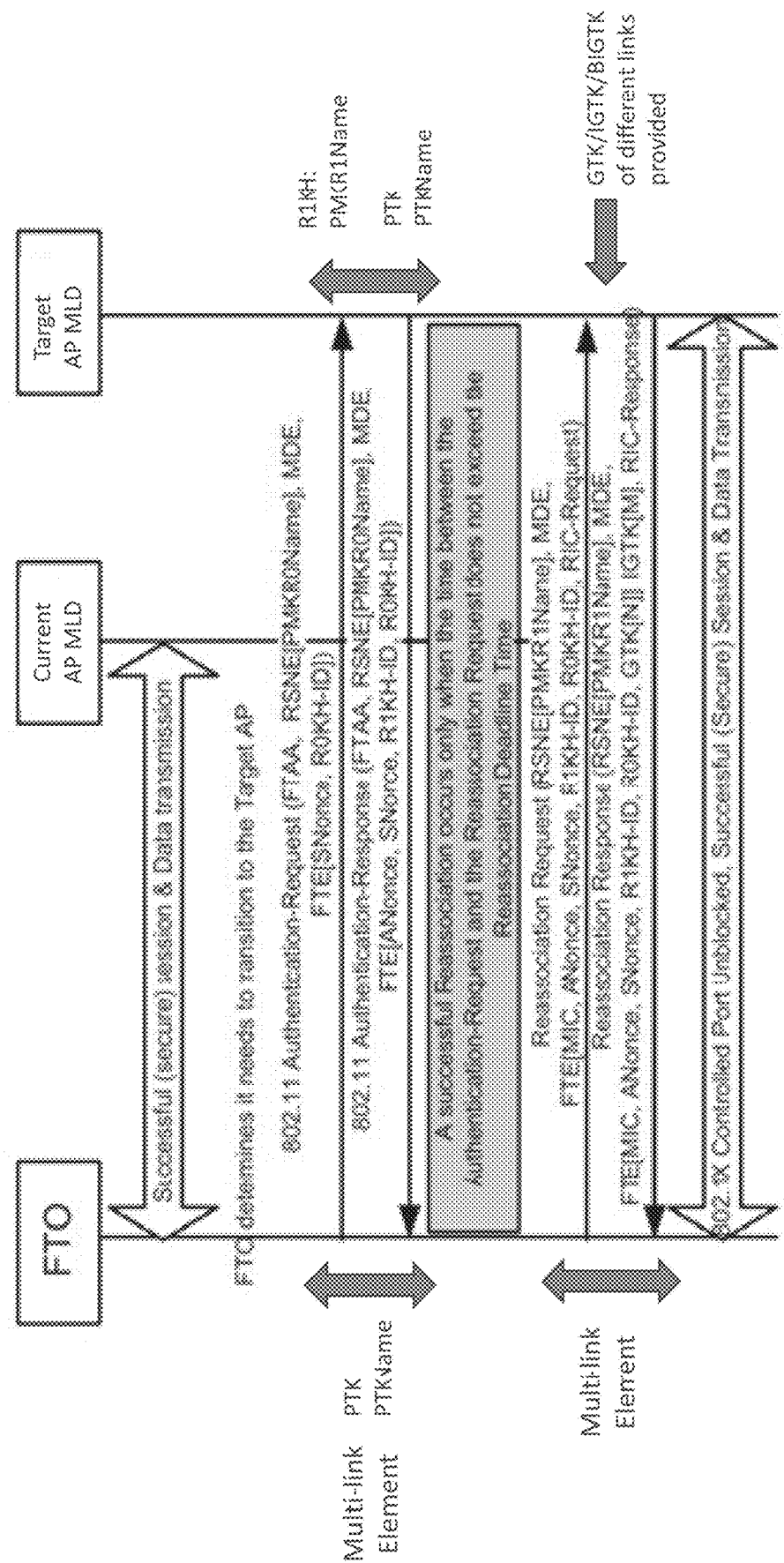
FIG. 10A illustrates over-the-air (OTA) FT protocols between a current access point (AP) MLD and a target AP MLD in accordance with some aspects.
Figure 10B:
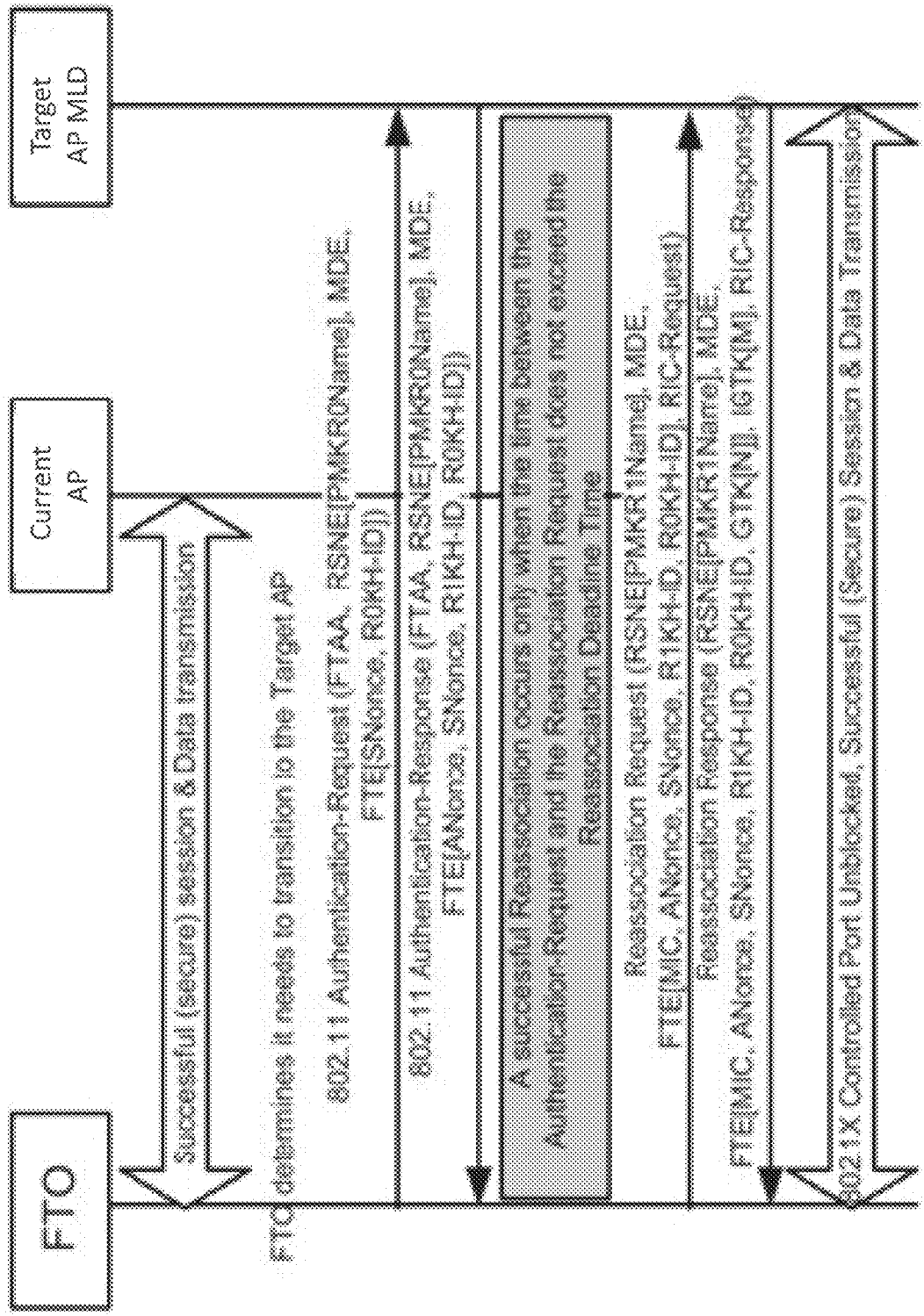
FIG. 10B illustrates OTA FT protocols between a current AP and a target AP MLD in accordance with some aspects.
Figure 10C:
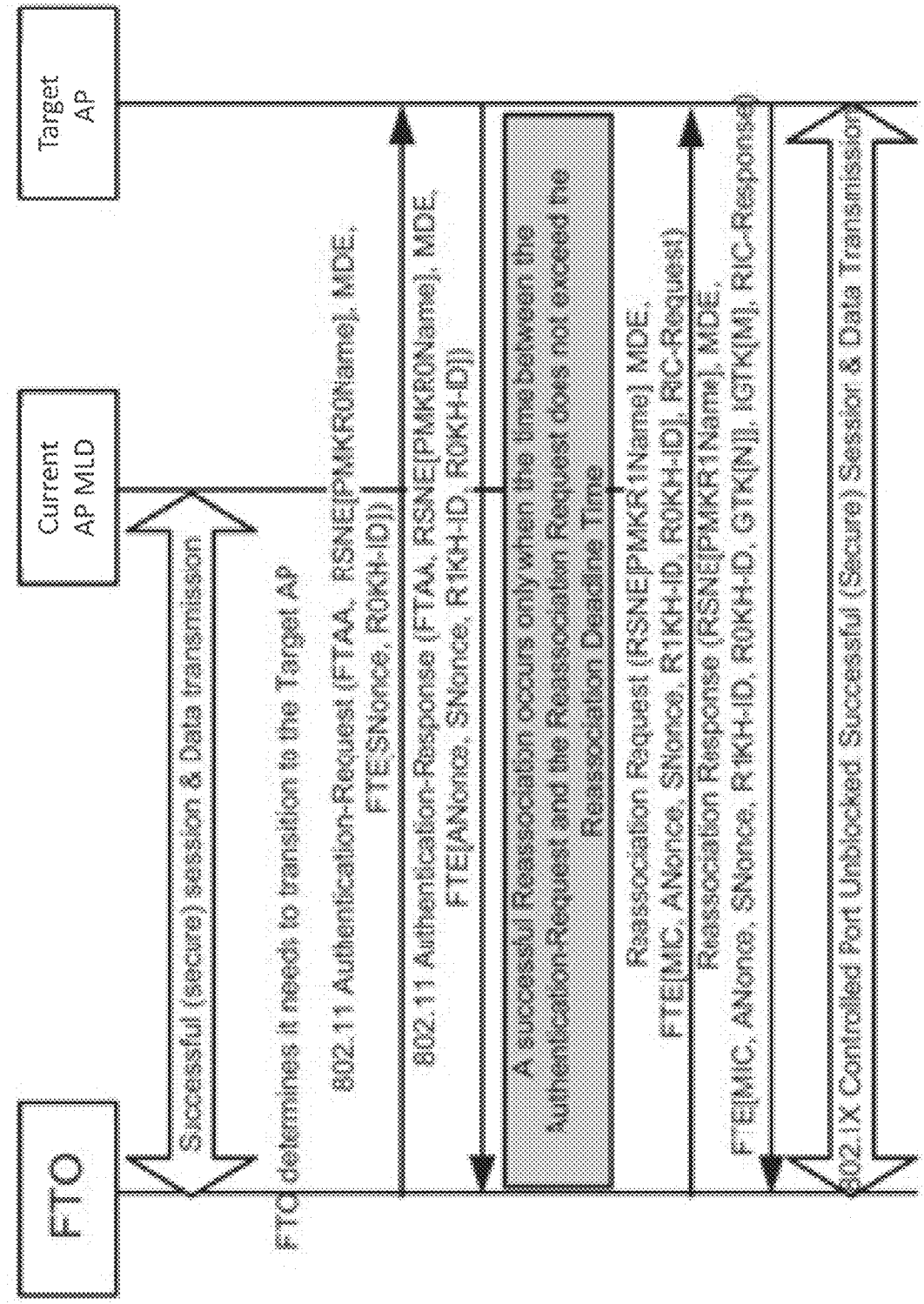
FIG. 10C illustrates OTA FT protocols between a current AP MLD and a target AP in accordance with some aspects.

FIGS. 10A-10C illustrate over-the-air FT protocols in accordance with some aspects. In particular, FIG. 10A illustrates OTA FT protocols between a current AP MLD and a target AP MLD in accordance with some aspects; FIG. 10B illustrates OTA FT protocols between a current AP and a target AP MLD in accordance with some aspects; and FIG. 10C illustrates OTA FT protocols between a current AP MLD and a target AP in accordance with some aspects. In particular, the flow for roaming in an RSN includes the STA or FTO performing FT authentication to generate a PTK based on the PMK-R1 between the STA and the target AP. PMK-R1 is generated based on PMK-R0. The STA or FTO performs a reassociation request/response exchange with the target AP. GTK, IGTK, BIGTK are delivered by the target AP in the FTE carried in the reassociation response.

In one or more embodiments, the key holder design is as follows: the R0HK/R1KH/S0KH/S1KH key holder is allowed to be within the MLD, R0KH and R1KH are in the AP MLD, the S0KH and S1KH are in the non-AP MLD, R0KH is in the AP MLD if the initial domain operation is a multi-link (re)setup between the AP MLD and the non-AP MLD, S0KH is in the non-AP MLD if the initial domain operation is a multi-link (re)setup between the AP MLD and the non-AP MLD, R1KH is in the AP MLD if the initial domain operation is a multi-link (re)setup between the AP MLD and the non-AP MLD, and S1KH is in the non-AP MLD if the initial domain operation is a multi-link (re)setup between the AP MLD and the non-AP MLD.

In one or more embodiments, the key computation is as follows: if S0KH is in the non-AP MLD, then S0KH-ID is the non-AP MLD MAC address; if S1KH is in the non-AP MLD, then S1KH-ID is the non-AP MLD MAC address; if R1KH is in the AP MLD, then R1KH-ID is the AP MLD MAC address. In this case, as above, AA may be adjusted to the AP MLD MAC address and SPA to may be adjusted to the non-AP MLD MAC address when PMKID is computed for PMK-R1 transmission between the AP MLD and the non-AP MLD. The BSSID may be changed to the AP MLD MAC address and the STA-ADDR may be changed to the non-AP MLD address when PTK and PTKName are computed between the AP MLD and the non-AP MLD. Based on above, similar computations of PMK-R0, PMK-R0Name, PMK-R1, PMKR1Name, PMKID, PTK, PIKName may be used. The current calculation formula is shown below.

R0-Key-Data=KDF-Hash-Length(XXKey,"FT-R0", SSIDlength|SSID|MDID|R0KH-length|R0KH-ID|S0KH-ID)

PMK-R0=$L$(RO-Key-Data,0,$Q$)

PMK-R0Name-Salt=$L$(RO-Key-Data,$Q$,128)

Length=$Q$+128

S0KH-ID is the supplicant's MAC address (SPA)

PMKR0Name=Truncate-128(Hash("FT-R0N"|PMK-R0Name-Salt)

PMK-R1=KDF-Hash-Length(PMK-R0,"FT-R1", R1KH-ID|S1KH-ID)

R1KH-ID is a MAC address of the holder of the PMK-R1 in the Authenticator of the AP
S1KH-ID is the SPA PMKR1Name=Truncate-128(Hash("FT-R1N"|PMK-R0Name|R1KH-ID|S1KH-ID)

PMKID=Truncate-128(HMAC-SHA-256(MPMK, "PMK Name"|AA|SPA)

PTK=KDF-Hash-Length(PMK-R1,"FT-PTK",SNonce|ANonce|BSSID|STA ADDR) where

PTKName=Truncate-128(SHA-256 (PMKR1Name|"FT-PTKN"|SNonce|ANonce|BSSID|STA-ADDR)

Thus, in RO-Key-Data: S0KH-ID is the non-AP MLD address; in PMK-R1 and PMKR1Name: R1KH-ID is the AP MLD address, and S1KH-ID is the non-AP MLD address; in PMKID AA is the AP MLD address, and SPA is the non-AP MLD address; in PTKName: BSSID is the AP MLD address, and STA-ADDR is the non-AP MLD address.

In one or more embodiments, key delivery of GTK/IGTK/BIGTK is as follows: if initial domain operation is multi-link setup between an AP MLD and a non-AP MLD, then the FT 4-way handshake can deliver GTK/IGTK/BIGTK of different links. Multi-link GTK KDE, Multi-link IGTK KDE, Multi-link BIGTK KDE can be defined to be carried in a FT 4-way handshake. Multi-link GTK KDE has the same format as GTK KDE except that an additional link ID field is used. Multi-link IGTK KDE has the same format as IGTK KDE except that an additional link ID field is used. Multi-link BIGTK KDE has the same format as BIGTK KDE except that an additional link ID field is used. If over-the-air FT protocol is between the non-AP MLD as the FTO and the target AP MLD, then the FTE can deliver GTK/IGTK/BIGTK of different links in the reassociation response.

Based on the current format of the FTE, the multi-link GTK sub-element, the multi-link IGTK sub-element, and the multi-link BIGTK sub-element may be added. The multi-link specific sub-element has the same format as the current sub-element, and the link ID may be added to determine the link for which the key will be applied.

FIGS. 11A-11C illustrate examples of different sub-elements. In particular, FIG. 11A illustrates a multi-link BIGTK sub-element in accordance with some aspects; FIG. 11B illustrates a multi-link IGTK sub-element in accordance with some aspects; and FIG. 11C illustrates a multi-link GTK sub-element in accordance with some aspects. FIG. 12A illustrates an FTE format in accordance with some aspects. FIG. 12B illustrates an optional parameters field format in accordance with some aspects. Table 1, below, shows the sub-element IDs for different values.

TABLE 1

| Sub-element IDs | |
|---|---|
| Value | Data Field Contents |
| 0 | Reserved |
| 1 | PMK-R1 key holder identifier (R1KH-ID) |
| 2 | GTK |
| 3 | PMK-R0 key holder identifier (R0KH-ID) |
| 4 | IGTK |
| 5 | Operating Channel Information (OCI) |
| 6 | BIGTK |
| 7-255 | Reserved |

For fast MLD transition from an AP MLD to a legacy AP or from a legacy AP to an AP MLD, S1KH-ID is the same when doing multi-link (re)setup with the AP MLD as a non-AP MLD or (re)association with a legacy AP as a non-AP STA. As a result, the non-AP MLD MAC address is the same as the MAC address of the non-AP STA.

For the authentication request/response between a non-AP MLD and an AP MLD, Address 1 and Address 2 of the authentication request/response frame is the address of the non-AP STA affiliated with the non-AP MLD or the AP affiliated with the AP MLD. The authentication request/response frame exchanges the MLD MAC address. The authentication request frame carries the non-AP MLD MAC address and the authentication response frame carries the AP MLD MAC address.

For the FT resource request protocol, the FT resource protocol can provide a resource information container (RIC) for request and response. FIG. 13A illustrates a RIC-request format in accordance with some aspects. FIG. 13B illustrates a Resource Request format in accordance with some aspects. In some embodiments, the Resource Request format and Resource Response format are the same. FIG. 13C illustrates a RIC-response format in accordance with some aspects. FIG. 13D illustrates a RIC Descriptor element in accordance with some aspects.

The RIC Descriptor element includes a new resource type so that a larger buffer size can be negotiated. Table 2 shows Resource type code in the RIC Descriptor element of FIG. 13D. FIG. 13E illustrates a DSE Registered Location element format in accordance with some aspects. The value of the resource type may be 2 and may be named a Block Ack with extended buffer size. The Block Ack has a Block Ack Parameter Set with an additional 8 bits for the buffer size. Hence, the total size of the RIC Descriptor element of FIG. 13D is 18 bits. FIG. 13F illustrates a Block Ack Parameter Set field format in accordance with some aspects. FIG. 13G illustrates a Block Ack Timeout Value field format in accordance with some aspects. FIG. 13H illustrates a Starting Sequence Control subfield format in accordance with some aspects.

TABLE 2

| Resource type code in RIC Descriptor element | | |
|---|---|---|
| Resource Type Value | Meaning | Variable parameters |
| 1 | Block Ack | Block Ack Parameter Set field value defined in 9.4.1.13 (Block Ack Parameter Set field), Block Ack Timeout field value defined in 9.4.1.14 (Block Ack Timeout field), and Block Ack Starting |

TABLE 2-continued

Resource type code in RIC Descriptor element

| Resource Type Value | Meaning | Variable parameters |
|---|---|---|
| 0, 1-255 | Reserved | Sequence Control subfield value defined in 9.3.1.7 (BlockAckReq frame format), |

Thus, while typically the PTK key is used to encrypt individually-addressed data and is generated between two STAs, in an MLD connection, the MLD PTK key is used to encrypt individually-addressed data between two MLDs and is generated between two MLDs. Thus, the MLD PTK can be used in any link between two MLDs. The address of the keyholder is used for the key derivation, and thus, as above, the MLD address or STA address may be used. Thus, for a non-AP MLD and an AP MLD in a FT initial mobility domain operation, a non-AP MLD address may be used to generate S1KH-ID and S0KH-ID and the AP MLD address may be used to generate R1KH-ID. For a non-AP MLD and a target AP MLD in an over-the-air FT operation, the non-AP MLD address may be used to generate S1KH-ID and the AP MLD address may be used to generate R1KH-ID. The keys may be delivered in a single frame. For example, GTK 1/IGTK 1/BIGTK 1 are used in link 1, GTK 2/IGTK 2/BIGTK 2 are used in link 2, and GTK 3/IGTK 3/BIGTK 3 are used in link 3, all of which the AP may deliver in one frame ((Re)Association response frame).

For over-the-DS FT protocol, the STA Address field in the FT action frame is the MLD address and the Target AP address field in the FT action frame is the AP MLD address if roaming to an AP MLD. FILS authentication occurs between two MLDs.

Figure 14:
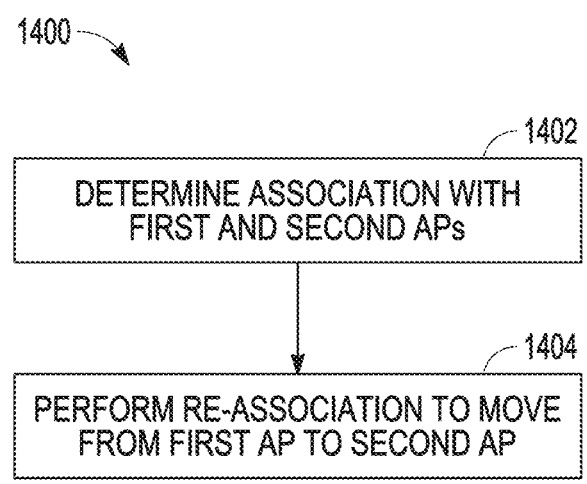
FIG. 14 illustrates MLD device re-setup and transition system in accordance with some aspects.

FIG. 14 illustrates MLD device re-setup and transition system in accordance with some aspects. In the process 1400, at block 1402, a device (e.g., the user device(s) 320 and/or the AP 302 of FIG. 3) may determine an association with a first AP and a second AP. At block 1404, the device may perform re-association to move from the first AP to the second AP.

It is understood that the above descriptions are for purposes of illustration and are not meant to be limiting.

Figure 15:
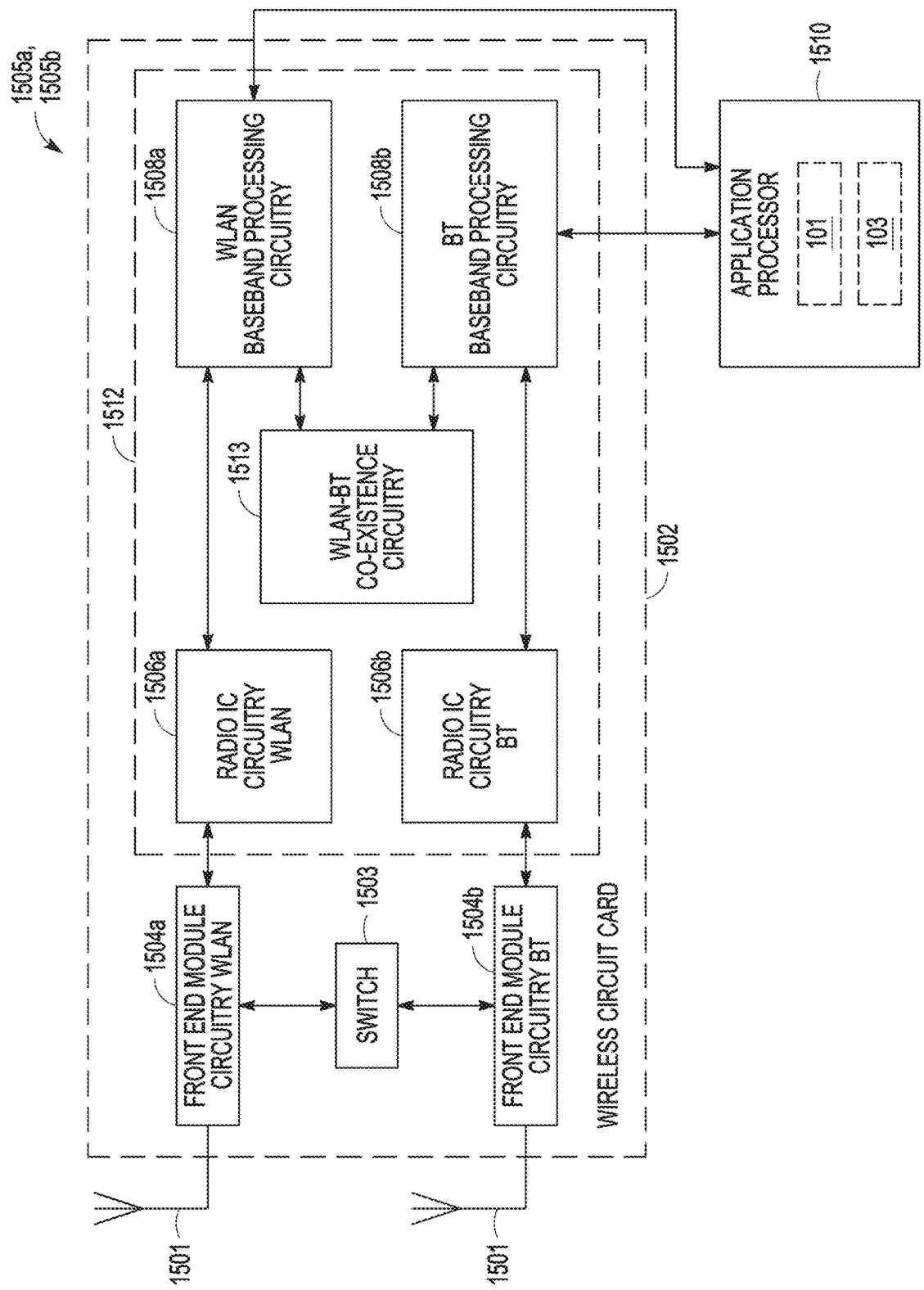
FIG. 15 is a block diagram of a radio architecture in accordance with some aspects.

FIG. 15 is a block diagram of a radio architecture in accordance with some aspects. The radio architecture 1505A, 1505B may be implemented in the example AP 300 and/or the example STA 302 of FIG. 3. Radio architecture 1505a, 1505b may include radio front-end module (FEM) circuitry 1504a, 1504b, radio IC circuitry 1506a, 1506b and baseband processing circuitry 1508a, 1508b. Radio architecture 1505a, 1505b as shown includes both WLAN functionality and BT functionality although embodiments are not so limited.

FEM circuitry 1504a, 1504b may include WLAN or Wi-Fi FEM circuitry 1504a and BT FEM circuitry 1504b. The WLAN FEM circuitry 1504a may include a receive signal path comprising circuitry configured to operate on WLAN RF signals received from one or more antennas 1501, to amplify the received signals and to provide the amplified versions of the received signals to the WLAN radio IC circuitry 1506a for further processing. The BT FEM circuitry 1504b may include a receive signal path which may include circuitry configured to operate on BT RF signals received from one or more antennas 1501, to amplify the received signals and to provide the amplified versions of the received signals to the BT radio IC circuitry 1506b for further processing. FEM circuitry 1504a may also include a transmit signal path which may include circuitry configured to amplify WLAN signals provided by the radio IC circuitry 1506a for wireless transmission by one or more of the antennas 1501. In addition, FEM circuitry 1504b may also include a transmit signal path which may include circuitry configured to amplify BT signals provided by the radio IC circuitry 1506b for wireless transmission by the one or more antennas. In the embodiment of FIG. 15, although FEM 1504a and FEM 1504b are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 1506a, 1506b as shown may include WLAN radio IC circuitry 1506a and BT radio IC circuitry 1506b. The WLAN radio IC circuitry 1506a may include a receive signal path which may include circuitry to down-convert WLAN RF signals received from the FEM circuitry 1504a and provide baseband signals to WLAN baseband processing circuitry 1508a. BT radio IC circuitry 1506b may in turn include a receive signal path which may include circuitry to down-convert BT RF signals received from the FEM circuitry 1504b and provide baseband signals to BT baseband processing circuitry 1508b. WLAN radio IC circuitry 1506a may also include a transmit signal path which may include circuitry to up-convert WLAN baseband signals provided by the WLAN baseband processing circuitry 1508a and provide WLAN RF output signals to the FEM circuitry 1504a for subsequent wireless transmission by the one or more antennas 1501. BT radio IC circuitry 1506b may also include a transmit signal path which may include circuitry to up-convert BT baseband signals provided by the BT baseband processing circuitry 1508b and provide BT RF output signals to the FEM circuitry 1504b for subsequent wireless transmission by the one or more antennas 1501. In the embodiment of FIG. 15, although radio IC circuitries 1506a and 1506b are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuity 1508a, 1508b may include a WLAN baseband processing circuitry 1508a and a BT baseband processing circuitry 1508b. The WLAN baseband processing circuitry 1508a may include a memory, such as, for example, a set of RAM arrays in a Fast Fourier Transform or Inverse Fast Fourier Transform block (not shown) of the WLAN baseband processing circuitry 1508a. Each of the WLAN baseband circuitry 1508a and the BT baseband circuitry 1508b may further include one or more processors and control logic to process the signals received from the corresponding WLAN or BT receive signal path of the radio IC circuitry 1506a, 1506b, and to also generate corresponding WLAN or BT baseband signals for the transmit signal path of the radio IC circuitry 1506a, 1506b. Each of the baseband processing circuitries 1508a and 1508b may further include physical layer (PHY) and medium access control layer (MAC) circuitry, and may further interface with a device for generation and processing of the baseband signals and for controlling operations of the radio IC circuitry 1506a, 1506b.

Referring still to FIG. 15, according to the shown embodiment, WLAN-BT coexistence circuitry 1513 may include logic providing an interface between the WLAN baseband circuitry 1508a and the BT baseband circuitry 1508b to enable use cases requiring WLAN and BT coexistence. In addition, a switch 1503 may be provided between the WLAN FEM circuitry 1504a and the BT FEM circuitry 1504b to allow switching between the WLAN and BT radios according to application needs. In addition, although the antennas 1501 are depicted as being respectively connected to the WLAN FEM circuitry 1504a and the BT FEM circuitry 1504b, embodiments include within their scope the sharing of one or more antennas as between the WLAN and BT FEMs, or the provision of more than one antenna connected to each of FEM 1504a or 1504b.

In some embodiments, the front-end module circuitry 1504a, 1504b, the radio IC circuitry 1506a, 1506b, and baseband processing circuitry 1508a, 1508b may be provided on a single radio card, such as wireless radio card 1502. In some other embodiments, the one or more antennas 1501, the FEM circuitry 1504a, 1504b and the radio IC circuitry 1506a, 1506b may be provided on a single radio card. In some other embodiments, the radio IC circuitry 1506a, 1506b and the baseband processing circuitry 1508a, 1508b may be provided on a single chip or integrated circuit (IC), such as IC 1512.

In some embodiments, the wireless radio card 1502 may include a WLAN radio card and may be configured for Wi-Fi communications, although the scope of the embodiments is not limited in this respect. In some of these embodiments, the radio architecture 1505a, 1505b may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 1505a, 1505b may be part of a Wi-Fi STA such as a wireless AP, a base station or a mobile device including a Wi-Fi device. In some of these embodiments, radio architecture 1505a, 1505b may be configured to transmit and receive signals in accordance with communication standards and/or protocols, such as that above. Radio architecture 1505a, 1505b may also be suitable to transmit and/or receive communications in accordance with other techniques and standards.

In some embodiments, the radio architecture 1505a, 1505b may be configured for high-efficiency Wi-Fi (HEW) communications in accordance with the IEEE 1502.11ax standard. In these embodiments, the radio architecture 1505a, 1505b may be configured to communicate in accordance with an OFDMA technique, although the scope of the embodiments is not limited in this respect.

In some other embodiments, the radio architecture 1505a, 1505b may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 15, the BT baseband circuitry 1508b may be compliant with a BT connectivity standard such as Bluetooth, Bluetooth 8.0 or Bluetooth 6.0, or any other iteration of the Bluetooth Standard. In some embodiments, the radio architecture 1505a, 1505b may include other radio cards, such as a cellular radio card configured for cellular (e.g., 3GPP such as LTE, LTE-Advanced or 5G communications).

In some IEEE 802.11 embodiments, the radio architecture 1505a, 1505b may be configured for communication over various channel bandwidths including bandwidths having center frequencies of about 900 MHz, 2.4 GHz, 5 GHz, and bandwidths of about 2 MHz, 4 MHz, 5 MHz, 5.5 MHz, 6 MHz, 8 MHz, 10 MHz, 20 MHz, 40 MHz, 80 MHz (with contiguous bandwidths) or 80+80 MHz (160 MHz) (with non-contiguous bandwidths). In some embodiments, a 920 MHz channel bandwidth may be used. The scope of the embodiments is not limited with respect to the above center frequencies however.

Figure 16:
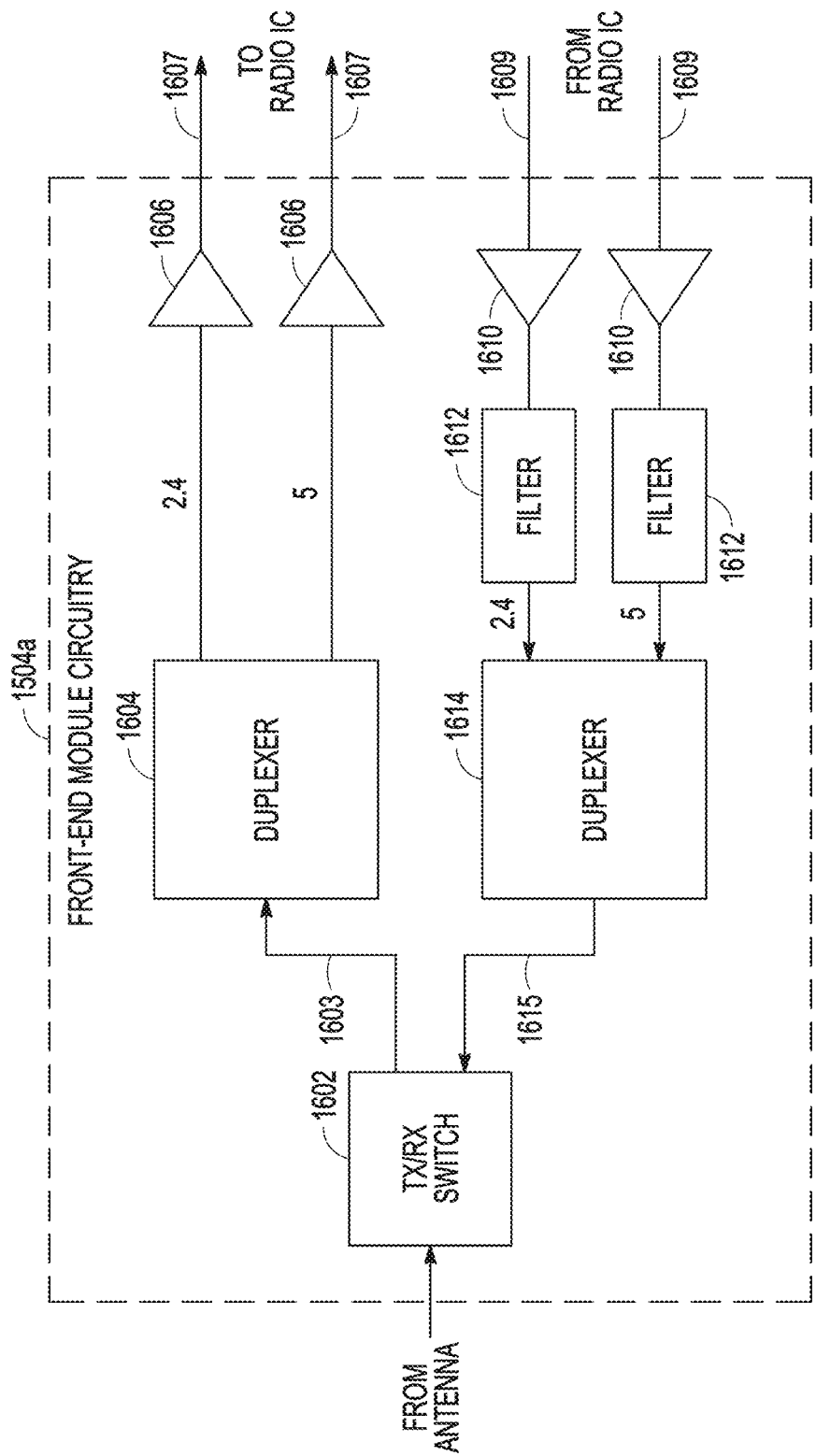
FIG. 16 illustrates an example front-end module circuitry for use in the radio architecture of FIG. 15 in accordance with some aspects.

FIG. 16 illustrates an example front-end module circuitry for use in the radio architecture of FIG. 15 in accordance with some aspects. FIG. 16 illustrates WLAN FEM circuitry 1604a in accordance with some embodiments. Although the example of FIG. 16 is described in conjunction with the WLAN FEM circuitry 1504a, the example of FIG. 16 may be described in conjunction with the example BT FEM circuitry 1504b (FIG. 15), although other circuitry configurations may also be suitable.

In some embodiments, the FEM circuitry 1504a may include a TX/RX switch 1602 to switch between transmit mode and receive mode operation. The FEM circuitry 1504a may include a receive signal path and a transmit signal path. The receive signal path of the FEM circuitry 1504a may include a low-noise amplifier (LNA) 1606 to amplify received RF signals 1603 and provide the amplified received RF signals 1607 as an output (e.g., to the radio IC circuitry 1506a, 1506b (FIG. 15)). The transmit signal path of the circuitry 1504a may include a power amplifier (PA) to amplify input RF signals 1609 (e.g., provided by the radio IC circuitry 1506a, 1506b), and one or more filters 1612, such as band-pass filters (BPFs), low-pass filters (LPFs) or other types of filters, to generate RF signals 1615 for subsequent transmission (e.g., by one or more of the antennas 1501 (FIG. 15)) via an example duplexer 1614.

In some dual-mode embodiments for Wi-Fi communication, the FEM circuitry 1504a may be configured to operate in either the 2.4 GHz frequency spectrum or the 5 GHz frequency spectrum. In these embodiments, the receive signal path of the FEM circuitry 1504a may include a receive signal path duplexer 1604 to separate the signals from each spectrum as well as provide a separate LNA 1606 for each spectrum as shown. In these embodiments, the transmit signal path of the FEM circuitry 1504a may also include a power amplifier 1610 and a filter 1612, such as a BPF, an LPF or another type of filter for each frequency spectrum and a transmit signal path duplexer 1604 to provide the signals of one of the different spectrums onto a single transmit path for subsequent transmission by the one or more of the antennas 1501 (FIG. 15). In some embodiments, BT communications may utilize the 2.4 GHz signal paths and may utilize the same FEM circuitry 1504a as the one used for WLAN communications.

Figure 17:
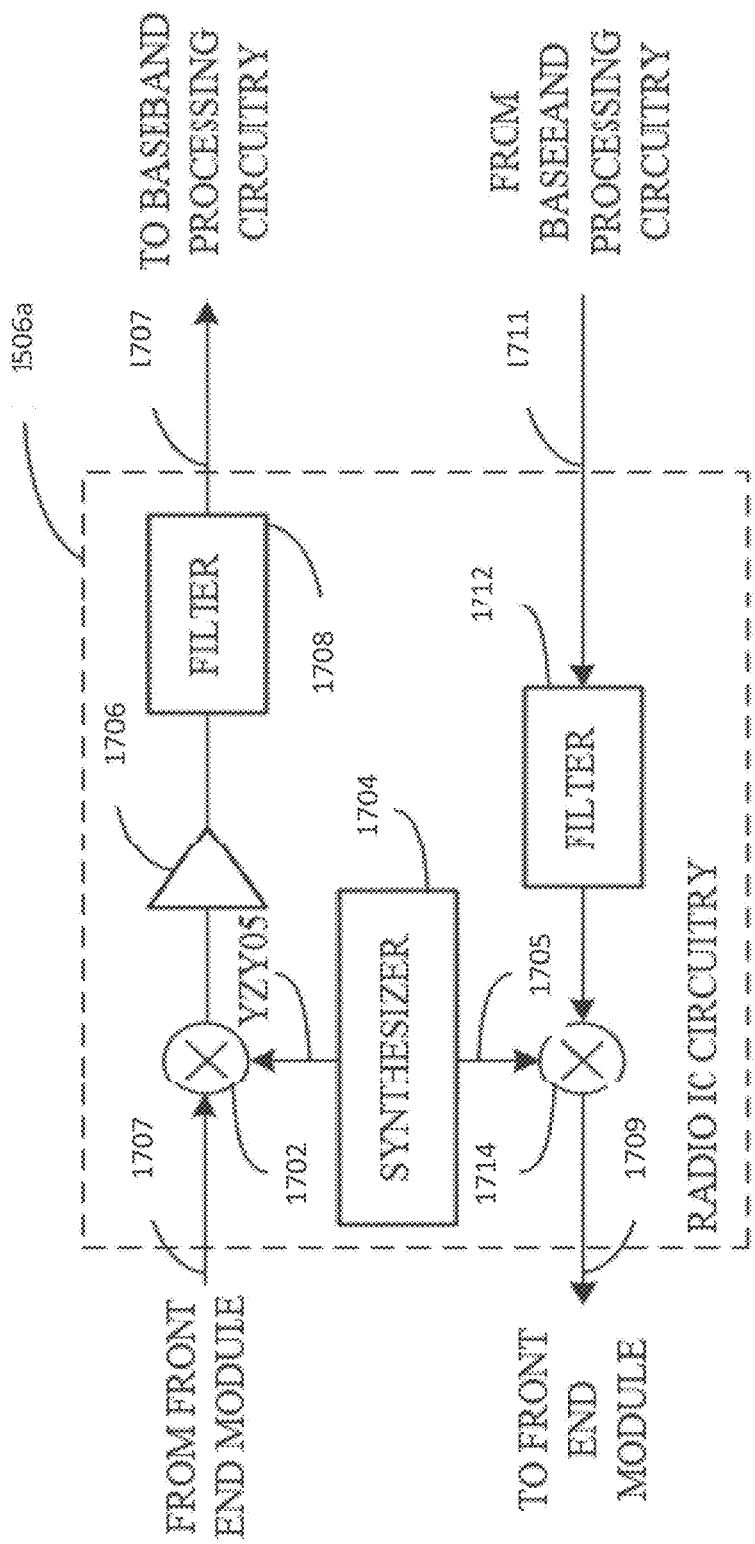
FIG. 17 illustrates an example radio integrated circuit (IC) circuitry for use in the radio architecture of FIG. 15 in accordance with some aspects.

FIG. 17 illustrates an example radio IC circuitry for use in the radio architecture of FIG. 15 in accordance with some aspects. The radio IC circuitry 1506a is one example of circuitry that may be suitable for use as the WLAN or BT radio IC circuitry 1506a/606b (FIG. 15), although other circuitry configurations may also be suitable. Alternatively, the example of FIG. 17 may be described in conjunction with the example BT radio IC circuitry 1506b.

In some embodiments, the radio IC circuitry 1506a may include a receive signal path and a transmit signal path. The receive signal path of the radio IC circuitry 1506a may include at least mixer circuitry 1702, such as, for example, down-conversion mixer circuitry, amplifier circuitry 1706 and filter circuitry 1708. The transmit signal path of the radio IC circuitry 1606a may include at least filter circuitry 1712 and mixer circuitry 1714, such as, for example, up-conversion mixer circuitry. Radio IC circuitry 1606a may also include synthesizer circuitry 1704 for synthesizing a frequency 1705 for use by the mixer circuitry 1702 and the mixer circuitry 1714. The mixer circuitry 1702 and/or 1714 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 17 illustrates only a simplified version of a radio IC circuitry, and may include, although not shown, embodiments where each of the depicted circuitries may include more than one component. For instance, mixer circuitry 1714 may each include one or more mixers, and filter circuitries 1708 and/or 1712 may each include one or more filters, such as one or more BPFs and/or LPFs according to application needs. For example, when mixer circuitries are of the direct-conversion type, they may each include two or more mixers.

In some embodiments, mixer circuitry 1702 may be configured to down-convert RF signals 1707 received from the FEM circuitry 1604a, 1604b (FIG. 16) based on the synthesized frequency 1705 provided by synthesizer circuitry 1704. The amplifier circuitry 1706 may be configured to amplify the down-converted signals and the filter circuitry 1708 may include an LPF configured to remove unwanted signals from the down-converted signals to generate output baseband signals 1707. Output baseband signals 1707 may be provided to the baseband processing circuitry 1608a, 1608b (FIG. 16) for further processing. In some embodiments, the output baseband signals 1707 may be zero-frequency baseband signals, although this is not a requirement. In some embodiments, mixer circuitry 1702 may comprise passive mixers, although the scope of the embodiments is not limited in this respect.

In some embodiments, the mixer circuitry 1714 may be configured to up-convert input baseband signals 1711 based on the synthesized frequency 1705 provided by the synthesizer circuitry 1704 to generate RF output signals 1709 for the FEM circuitry 1504a, 1504b. The baseband signals 1711 may be provided by the baseband processing circuitry 1508a, 1508b and may be filtered by filter circuitry 1712. The filter circuitry 1712 may include an LPF or a BPF, although the scope of the embodiments is not limited in this respect.

In some embodiments, the mixer circuitry 1702 and the mixer circuitry 1714 may each include two or more mixers and may be arranged for quadrature down-conversion and/or up-conversion respectively with the help of synthesizer 1704. In some embodiments, the mixer circuitry 1702 and the mixer circuitry 1714 may each include two or more mixers each configured for image rejection (e.g., Hartley image rejection). In some embodiments, the mixer circuitry 1702 and the mixer circuitry 1714 may be arranged for direct down-conversion and/or direct up-conversion, respectively. In some embodiments, the mixer circuitry 1702 and the mixer circuitry 1714 may be configured for super-heterodyne operation, although this is not a requirement.

Mixer circuitry 1702 may comprise, according to one embodiment: quadrature passive mixers (e.g., for the in-phase (I) and quadrature phase (Q) paths). In such an embodiment, RF input signal 1707 from FIG. 17 may be down-converted to provide I and Q baseband output signals to be sent to the baseband processor.

Quadrature passive mixers may be driven by zero and ninety-degree time-varying LO switching signals provided by a quadrature circuitry which may be configured to receive a LO frequency (fLO) from a local oscillator or a synthesizer, such as LO frequency 1705 of synthesizer 1704 (FIG. 17). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have an 85% duty cycle and an 80% offset. In some embodiments, each branch of the mixer circuitry (e.g., the in-phase (I) and quadrature phase (Q) path) may operate at an 80% duty cycle, which may result in a significant reduction is power consumption.

The RF input signal 1707 (FIG. 17) may comprise a balanced signal, although the scope of the embodiments is not limited in this respect. The I and Q baseband output signals may be provided to low-noise amplifier, such as amplifier circuitry 1706 (FIG. 17) or to filter circuitry 1708 (FIG. 17).

In some embodiments, the output baseband signals 1707 and the input baseband signals 1711 may be analog baseband signals, although the scope of the embodiments is not limited in this respect. In some alternate embodiments, the output baseband signals 1707 and the input baseband signals 1711 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 1704 may be a fractional-N synthesizer or a fractional N/N+1 synthesizer, although the scope of the embodiments is not limited in this respect as other types of frequency synthesizers may be suitable. For example, synthesizer circuitry 1704 may be a delta-sigma synthesizer, a frequency multiplier, or a synthesizer comprising a phase-locked loop with a frequency divider. According to some embodiments, the synthesizer circuitry 1704 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuitry 1704 may be provided by a voltage controlled oscillator (VCO), although that is not a requirement. A divider control input may further be provided by either the baseband processing circuitry

1608a, 1608b (FIG. 16) depending on the desired output frequency 1705. In some embodiments, a divider control input (e.g., N) may be determined from a look-up table (e.g., within a Wi-Fi card) based on a channel number and a channel center frequency as determined or indicated by the example application processor 1610. The application processor 1610 may include, or otherwise be connected to, one of the example secure signal converter or the example received signal converter (e.g., depending on which device the example radio architecture is implemented in).

In some embodiments, synthesizer circuitry 1704 may be configured to generate a carrier frequency as the output frequency 1705, while in other embodiments, the output frequency 1705 may be a fraction of the carrier frequency (e.g., one-half the carrier frequency, one-third the carrier frequency). In some embodiments, the output frequency 1705 may be a LO frequency (fLO).

Figure 18:
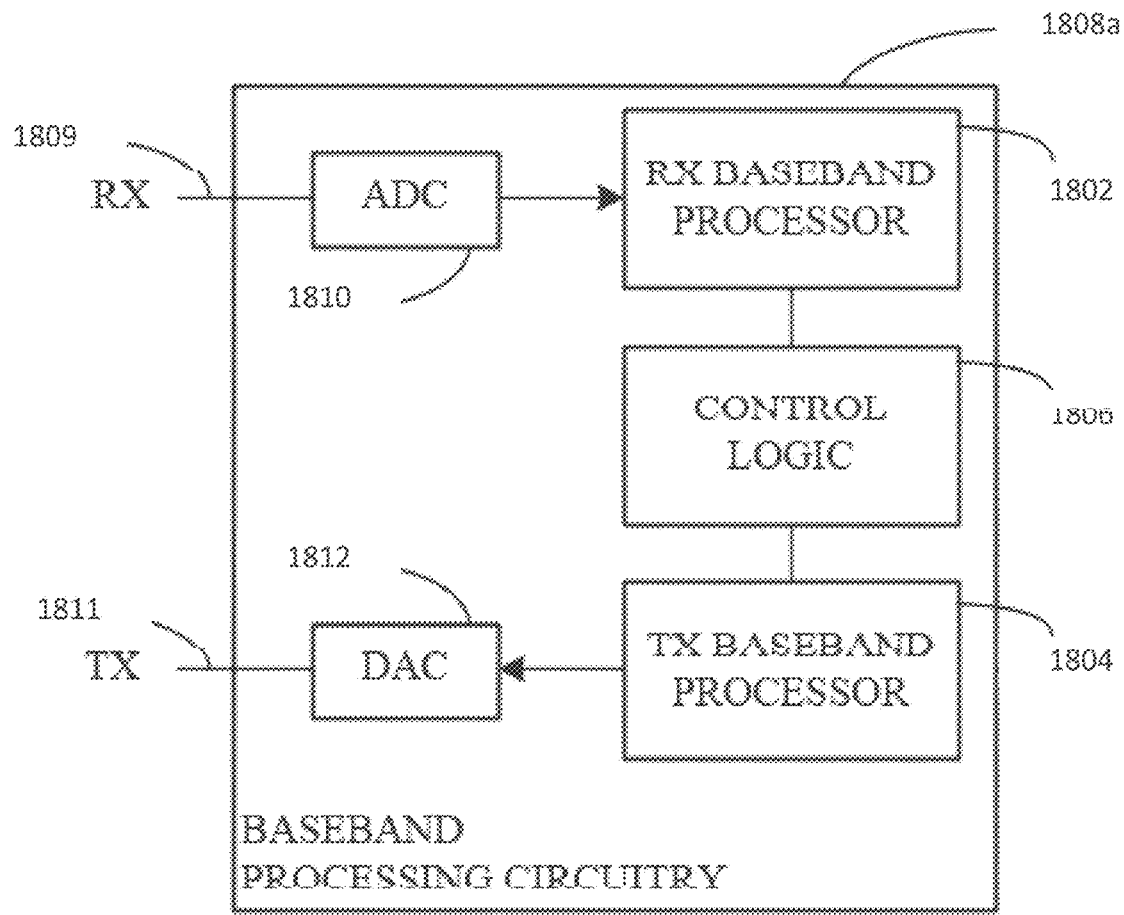
FIG. 18 illustrates an example baseband processing circuitry for use in the radio architecture of FIG. 15 in accordance with some aspects.

FIG. 18 illustrates an example baseband processing circuitry for use in the radio architecture of FIG. 15 in accordance with some aspects. The baseband processing circuitry 1508a is one example of circuitry that may be suitable for use as the baseband processing circuitry 1508a (FIG. 15), although other circuitry configurations may also be suitable. Alternatively, the example of FIG. 18 may be used to implement the example BT baseband processing circuitry 1508b of FIG. 15.

The baseband processing circuitry 1508a may include a receive baseband processor (RX BBP) 1802 for processing receive baseband signals 1809 provided by the radio IC circuitry 1506a, 1506b (FIG. 15) and a transmit baseband processor (TX BBP) 1804 for generating transmit baseband signals 1811 for the radio IC circuitry 1506a, 1506b. The baseband processing circuitry 1508a may also include control logic 1806 for coordinating the operations of the baseband processing circuitry 1508a.

In some embodiments (e.g., when analog baseband signals are exchanged between the baseband processing circuitry 1508a, 1508b and the radio IC circuitry 1506a, 1506b), the baseband processing circuitry 1508a may include ADC 1810 to convert analog baseband signals 1809 received from the radio IC circuitry 1506a, 1506b to digital baseband signals for processing by the RX BBP 1802. In these embodiments, the baseband processing circuitry 1508a may also include DAC 1812 to convert digital baseband signals from the TX BBP 1804 to analog baseband signals 1811.

In some embodiments that communicate OFDM signals or OFDMA signals, such as through baseband processor 1508a, the transmit baseband processor 1804 may be configured to generate OFDM or OFDMA signals as appropriate for transmission by performing an inverse fast Fourier transform (IFFT). The receive baseband processor 1802 may be configured to process received OFDM signals or OFDMA signals by performing an FFT. In some embodiments, the receive baseband processor 1802 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 15, in some embodiments, the antennas 1501 (FIG. 15) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 1501 may each include a set of phased-array antennas, although embodiments are not so limited.

Although the radio architecture 1505a, 1505b is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

The term "access point" (AP) as used herein may be a fixed station. An access point may also be referred to as an access node, a base station, an evolved node B (eNodeB), or some other similar terminology known in the art. An access terminal may also be called a mobile station, user equipment (UE), a wireless communication device, or some other similar terminology known in the art. Embodiments disclosed herein generally pertain to wireless networks. Some embodiments may relate to wireless networks that operate in accordance with one of the IEEE 802.11 standards.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

Embodiments according to the disclosure are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A non-access point (AP) multi-link device (MLD) comprising:
   processing circuitry configured to:
   perform initial association with an initial transition peer;
   after completing the initial association with the initial transition peer, engage a fast MLD transition from the initial transition peer to a fast transition target in a same extended service set (ESS) as the initial transition peer, the fast MLD transition being an MLD transition that establishes a state for data connectivity before multi-link resetup or reassociation rather than after the multi-link resetup or reassociation, the fast MLD transition configured to use keys based on a non-AP MLD address and an AP MLD address, at least one of the initial transition peer or the fast transition target being an AP MLD having a plurality of links with the non-AP MLD, each link connecting a station (STA) of the non-AP MLD with an individual AP of the AP MLD,
   wherein the AP MLD is a R0 key holder (R0KH) and a R1KH, and the non-AP MLD is a S0KH and S1KH, the fast transition target is the AP MLD, R1KH-ID is a medium access control layer (MAC) address of the AP MLD,
   S0KH-ID and S1KH-ID is a MAC address of the non-AP MLD; and
   exchange the MAC address of the AP MLD and the MAC address of the non-AP MLD in at least one of Authentication Request and Authentication Response messages or Association Request and Association Response messages; and
   memory configured to store keys to engage in the fast MLD transition.

2. The non-AP MLD of claim 1, wherein the fast MLD transition occurs in a mobility domain, the mobility domain including a set of Basic Service Sets (BSSs) and a set of service sets created by the AP MLD, within the ESS, that support fast BSS transitions and fast MLD transitions between the BSSs and service sets created by AP MLD and are each identified by a mobility domain identifier (MDID) of the mobility domain.

3. The non-AP MLD of claim 1, wherein an Authenticator Address (AA) is the MAC address of the AP MLD and a supplicant MAC address (SPA) is the MAC address of the non-AP MLD during computation of a Pairwise Master Key (PMK)ID for a PMK-R1 between the AP MLD and the non-AP MLD.

4. The non-AP MLD of claim 1, wherein a Basic Service Set (BSS) ID is replaced with the MAC address of the AP MLD and a STA-ADDR is the MAC address of the non-AP MLD during computation of a Pairwise Transit Key (PTK) and PTKName between the AP MLD and the non-AP MLD.

5. The non-AP MLD of claim 1, wherein the processing circuitry is further configured to exchange a group temporal key (GTK), an integrity group temporal key (IGTK) and beacon integrity group transient key (BIGTK) of the links in a single fast transition (FT) 4-way handshake and an FT element (FTE) during a reassociation response from the AP MLD.

6. The non-AP MLD of claim 1, wherein the initial association peer is a first AP MLD and the fast transition target is a second AP MLD.

7. The non-AP MLD of claim 6, wherein the processing circuitry is further configured to:
   to perform the initial association, engage in a fast transition (FT) initial mobility domain operation with the first AP MLD in which an R1 key holder (R1KH)-ID is a medium access control layer (MAC) address of the first AP MLD and a S0KH-ID and a S1KH-ID is a MAC address of the non-AP MLD; and
   engage in an over-the-air FT operation from the first AP MLD to the second AP MLD in which the R1KH-ID is a MAC address of the second AP MLD and the S1KH-ID is the MAC address of the non-AP MLD.

8. The non-AP MLD of claim 1, wherein one of the initial association peer or the fast transition target is the AP MLD and another of the initial association peer or the fast transition target is a legacy AP.

9. A computer-readable storage medium that stores instructions for execution by one or more processors configured to operate as a non-access point (AP) multi-link device (MLD), the instructions when executed configure the one or more processors to:
   perform association with an initial association peer through a fast transition (FT) initial mobility domain operation with the initial association peer when the initial association peer is an AP MLD, the FT initial mobility domain operation employing a medium access control layer (MAC) address of the AP MLD as an R1 key holder (R1KH)-ID and a MAC address of the non-AP MLD as a S0KH-ID and a S1KH-ID, the AP MLD having a plurality of links with the non-AP MLD, each link connecting a station (STA) of the non-AP MLD with an individual AP of the AP MLD;
   engage in a fast MLD transition to a fast transition target in a same extended service set (ESS) as the initial association peer, the fast MLD transition configured to use, when the fast transition target is another AP MLD, a MAC address of the other AP MLD as the R1KH-ID and the MAC address of the non-AP MLD as the S1KH-ID,
   wherein the AP MLD is a R0 key holder (R0KH) and a R1KH, and the non-AP MLD is a S0KH and S1KH, the fast transition target is the AP MLD, R1KH-ID is a medium access control layer (MAC) address of the AP MLD, S0KH-ID and S1KH-ID is a MAC address of the non-AP MLD; and exchange the MAC address of the AP MLD and the MAC address of the non-AP MLD in at least one of Authentication Request and Authentication Response messages or Association Request and Association Response messages.

10. The medium of claim 9, wherein the fast MLD transition occurs in a mobility domain, the mobility domain including a set of Basic Service Sets (BSSs) and a set of service sets created by the AP MLD, within the ESS, that support fast BSS transitions and fast MLD transitions between the BSSs and service sets created by AP MLD and are each identified by a mobility domain identifier (MDID) of the mobility domain.

11. The medium of claim 9, wherein:
an Authenticator Address (AA) is the MAC address of the AP MLD and a supplicant MAC address (SPA) is the MAC address of the non-AP MLD during computation of a Pairwise Master Key (PMK)ID for a PMK-R1 between the AP MLD and the non-AP MLD, and
a BSS is the MAC address of the AP MLD and a STA-ADDR is the MAC address of the non-AP MLD during computation of a Pairwise Transit Key (PTK) and PTKName between the AP MLD and the non-AP MLD.

12. The medium of claim 9, wherein the instructions when executed configure the one or more processors to exchange a group temporal key (GTK), an integrity group temporal key (IGTK) and a beacon integrity group transient key (BIGTK) of the links between the AP MLD and the non-AP MLD in a single initial FT 4-way handshake using an FT element (FTE) during the FT initial mobility domain operation.

13. The medium of claim 9, wherein the instructions when executed configure the one or more processors to exchange a group temporal key (GTK), an integrity group temporal key (IGTK) and a beacon integrity group transient key (BIGTK) of the links between the other AP MLD and the non-AP MLD during a reassociation response from the other AP MLD during the FT MLD transition.

14. A computer-readable storage medium that stores instructions for execution by one or more processors configured to operate as an access point (AP) multi-link device (MLD), the instructions when executed configure the one or more processors to:
perform association with a first non-AP MLD through a fast transition (FT) initial mobility domain operation, the FT initial mobility domain operation employing a medium access control layer (MAC) address of the AP MLD as an R1 key holder (R1KH)-ID and a MAC address of the non-AP MLD as a S0KH-ID and a S1KH-ID, the AP MLD having a plurality of links with the first non-AP MLD, each link connecting a station (STA) of the first non-AP MLD with an individual AP of the AP MLD;
engage in a fast MLD transition, for a second non-AP MLD, from another AP MLD in a same extended service set (ESS) as the AP MLD, the fast MLD transition configured to use a MAC address of the AP MLD as the R1KH-ID and the MAC address of the second non-AP MLD as the S1KH-ID, the AP MLD having a plurality of links with the second non-AP MLD after the fast MLD transition, each link connecting a STA of the second non-AP MLD with an individual AP of the AP MLD; and
exchange the MAC address of the AP MLD with the MAC address of the first non-AP MLD in at least one of Authentication Request and Authentication Response messages or Association Request and Association Response messages.

15. The medium of claim 14, wherein the instructions when executed configure the one or more processors to:
exchange, with the first non-AP MLD, a group temporal key (GTK), an integrity group temporal key (IGTK) and beacon integrity group transient key (BIGTK) of the links between the AP MLD and the first non-AP MLD in a single initial FT 4-way handshake using an FT element (FTE) during the FT initial mobility domain operation, and
exchange, with the second non-AP MLD, a GTK, an IGTK and a BIGTK of the links between the AP MLD and the second non-AP MLD in a reassociation response during the FT MLD transition.

* * * * *